United States Patent
Maclean et al.

(10) Patent No.: US 12,514,552 B2
(45) Date of Patent: Jan. 6, 2026

(54) METHODS AND APPARATUS FOR LOCALIZATION AND NAVIGATION OF SURGICAL TOOLS

(71) Applicant: The University of British Columbia, Vancouver (CA)

(72) Inventors: Luke Jeffrey Maclean, Vancouver (CA); Antony J. Hodgson, Vancouver (CA)

(73) Assignee: The University of British Columbia, Vancouver (CA)

( * ) Notice: Subject to any disclaimer, the term of this patent is extended or adjusted under 35 U.S.C. 154(b) by 206 days.

(21) Appl. No.: 18/330,983

(22) Filed: Jun. 7, 2023

(65) Prior Publication Data

US 2023/0389896 A1    Dec. 7, 2023

Related U.S. Application Data

(60) Provisional application No. 63/349,635, filed on Jun. 7, 2022.

(51) Int. Cl.
*A61B 8/00* (2006.01)
*A61B 8/12* (2006.01)

(52) U.S. Cl.
CPC .............. *A61B 8/4488* (2013.01); *A61B 8/12* (2013.01); *A61B 8/4477* (2013.01)

(58) Field of Classification Search
CPC ....... A61B 8/4488; A61B 8/12; A61B 8/4477; A61B 2090/061; A61B 2090/062
See application file for complete search history.

(56) References Cited

U.S. PATENT DOCUMENTS 9,226,780 B2    1/2016  Glazer
11,497,470 B2 *  11/2022  Saroha ................. A61B 8/4488
(Continued)

FOREIGN PATENT DOCUMENTS

EP         3426159 B1     5/2021
WO      2006092594 A2     9/2006

OTHER PUBLICATIONS

"Drill." Merriam-Webster.com Dictionary, Merriam-Webster, https://www.merriam-webster.com/dictionary/drill. Accessed Mar. 25, 2025. (Year: 2025).*

(Continued)

*Primary Examiner* — Joel Lamprecht
(74) *Attorney, Agent, or Firm* — Oyen Wiggs Green & Mutala LLP

(57) ABSTRACT

Apparatus for monitoring a pose of a tool relative to an object includes plural range sensors arranged on a support. The range sensors may be provided by plural ultrasound transducers. The support is integrated with or coupled to: the tool. The tool may comprise a guide configured to constrain another tool to be moved along an axis defined by the guide. The transducers output signals that encode plural measured distances between points having known locations relative to the support and points on a surface of the object. A data processing system is configured to: process the signals to obtain the plural measured distances; and process the measured distances to generate an estimated pose of the support relative to the object. A user feedback interface is operative to communicate to a user information about a current pose of the tool relative to the object. The apparatus has example application in surgery including drilling holes for pedicle screws.

23 Claims, 15 Drawing Sheets

(56) References Cited

U.S. PATENT DOCUMENTS

| | | | |
|---|---|---|---|
| 2002/0120197 | A1 | 8/2002 | Kleffner et al. |
| 2003/0187348 | A1 | 10/2003 | Goodwin |
| 2008/0228231 | A1 | 9/2008 | Raphael et al. |
| 2013/0150863 | A1 | 6/2013 | Baumgartner |
| 2016/0106392 | A1 | 4/2016 | Manbachi et al. |
| 2020/0289133 | A1* | 9/2020 | Elbanna ............. A61B 17/1615 |

OTHER PUBLICATIONS

"Bur." Merriam-Webster.com Dictionary, Merriam-Webster, https://www.merriam-webster.com/dictionary/bur. Accessed Mar. 25, 2025. (Year: 2025).*

Gerardo, C. D. et al., "Fabrication and testing of polymer-based capacitive micromachined ultrasound transducers for medical imaging", Microsyst Nanoeng 4, 19 (2018); https://doi.org/10.1038/s41378-018-0022-5.

Manbachi, A. "On the development of a 2MHz radial imaging ultrasound array for potential use in guiding pedicle screw insertion", PhD thesis, University of Toronto, 2015.

Manbachi, A. et al., "Guided pedicle screw insertion: techniques and training", The Spine Journal (2014), 14(1): 165-179.

Yi, T. et al., "Technical note: known-component registration for robotic drill guide positioning", Proc SPIE 10576, Medical Imaging 2018: Image-Guided Procedures, Robotic Interventions, and Modeling, 105760L (Mar. 13, 2018); https://doi.org/10.1117/12.2322408.

* cited by examiner

METHODS AND APPARATUS FOR LOCALIZATION AND NAVIGATION OF SURGICAL TOOLS

This application claims the benefit of U.S. application No. 63/349,635 filed on Jun. 7 2022 and titled Ultrasound-Augmented Tools for Self-Localization and Self-Navigation in Surgery. U.S. patent application No. 63/349,635 is hereby incorporated herein by reference as if fully set out herein for all purposes.

FIELD

This technology relates to methods and apparatus for localizing and navigating tools. The technology has example application to surgical tools. Some embodiments provide drill guides which may be used, for example, to place a drill at a location and in an orientation for drilling a channel in bone, for example a channel to receive a pedicle screw.

BACKGROUND

Instrumented procedures are important in modern clinical care and other applications. Many such procedures require that tools be positioned with high precision to avoid complications. Modern medical navigation systems using intraoperative cone-beam CT, optical tool tracking and/or robotic guidance have greatly improved instrumentation accuracy and lowered complications. However, these modern systems have limitations. Many systems require intraoperative radiation which is inappropriate for pediatric and pregnant patients. Exposure to radiation is generally undesirable for both physicians and patients. Equipment for radiation guided navigation can be cost-prohibitive for small to medium sized surgical centers.

Inserting pedicle screws is one example of an instrumented procedure. Pedicle screws may be inserted to correct certain spinal deformities by fusion. Placing pedicle screws is a challenging task due to the tight spatial constraints. Freehand placement of pedicle screws is associated with nontrivial complications (up to 9.3%) and reoperation rates (up to 10%). Pedicle screw malpositioning can cause severe complications including vascular damage, neurological deficits and vertebral fractures.

Several different techniques have been proposed and used for guiding pedicle screw placement. Traditional techniques base the trajectory on visually identifying vertebral anatomy but these methods have high malplacement rates. Malposition rates of pedicle screws with the freehand technique are between 6% and 31% according to a 2012 meta-analysis. A more recent (2019) meta-analysis had an overall pooled malposition of 6.9%.

Intraoperative fluoroscopy may be used for imaging the screw insertion in two orthogonal planes. The imaging is dynamic but often exposes the surgeon to high levels of ionizing radiation and makes the technique unsuitable for pediatric patients. Fluoroscopy also produces malplacement rates of around 8.5% and reoperation rates up to 6.9%.

Computer-navigation with optically tracked tools uses an intraoperative cone-beam CT (CBCT) to take a 3D image of the spine. An optically tracked marker frame, rigidly attached to a spinous process, acts as a reference for registering an optically tracked drill to the spine anatomy. The screw placement is then guided in three dimensions (3D) and the surgeon is provided three orthogonal views as guidance. This technique has a lower malplacement error of 4.5%, but re-registration is required when screws are to be inserted further from the originally registered vertebra or if the registration frame is inadvertently displaced. In addition, the radiation involved means this technique is less suitable for pediatric or pregnant patients.

Robotic devices, such as the Mazor X™ spine robot or the Globus ExclesiusGPS™, can be used to augment computer navigation. These systems have high cost and still require the patient to be exposed to intraoperative radiation.

There is a need for cost effective and accurate alternative systems and methods for tracking the position and/or pose of tools relative to bones and other objects.

SUMMARY

This disclosure describes an invention which has various aspects. These aspects include without limitation: surgical navigation systems and methods, apparatus operable to determine poses of tools relative to objects of interest; methods for determining poses of tools relative to objects of interest; computer program products carrying machine readable instructions executable by a data processing system to perform a method for determining a pose of a tool; and supports and/or tools equipped with range sensors as described herein.

One aspect of this invention provides apparatus for monitoring a pose of a tool relative to an object. The object may, for example, be a bone of a patient such as a vertebra. The apparatus comprises a plurality of transducers arranged on a support that is integrated with or coupled to the tool. In some embodiments the support is provided by a portion of an outer surface of the tool. The transducers are operative to output one or more signals that encode plural measured distances. The plural measured distances are distances between points having known locations relative to the support and points on a surface of the object. A data processing system is configured to: process the one or more signals to obtain the plural measured distances; and process the plural measured distances to generate an estimated pose of the support relative to the object. The apparatus includes a user feedback interface operative to communicate to a user information about a current pose of the tool relative to the object.

In some embodiments the user feedback interface comprises a navigational display configured to graphically depict the current pose relative to the object. The navigational display may be additionally configured to graphically depict a desired pose for using the tool.

In some embodiments the visual feedback system comprises one or more of a navigation display, haptic or tactile feedback device, acoustic feedback device and visual feedback device.

In some embodiments the data processing system comprises: a distance estimation component operative to receive an input pose of the support relative to the object and to generate plural estimated distances using a computational model of the object wherein the plural estimated distances respectively correspond to the plural measured distances for the case where the pose of the support matches the input pose; and a pose estimation component configured to generate the estimated pose using the distance estimation component to find the estimated pose which minimizes a measure of differences between the plural measured distances and the plural estimated distances.

In some embodiments the data processing system is configured to exclude from the plural measured distances distances that exceed a threshold distance.

In some embodiments, the data processing system is configured to perform an optimization to process the plural measured distances to generate the estimated pose of the support relative to the object. The optimization may be configured to find an extremum of a cost function. One example cost function comprises a sum of terms which each comprise a difference between one of the measured distances and a corresponding estimated distance. The estimated distances may be calculated from a current estimate of the pose of the support and a computational model of the object. Another example cost function comprises a sum of terms which each comprise a shortest distance between a point in a point cloud and the surface of the object. Locations of points in the point cloud may be determined from the measured distances and a current estimate of the pose of the support.

In some embodiments the apparatus comprises a machine learning model. The machine learning model may have inputs for receiving the plural measured distances. The machine learning model may be trained to generate the estimated pose in response to the plural measured distances.

In some embodiments the apparatus comprises a machine learning model having inputs for receiving images of the object, the machine learning model being trained to segment the surface of the object from the images and to determine the plural measured distances based on the segmented surface of the object.

In some embodiments the transducers comprise ultrasound transducers. In some embodiments the ultrasound transducers are operated individually and/or in groups as range sensors.

In some embodiments the ultrasound transducers comprise capacitive micromachined ultrasonic transducers (CMUTs). In some embodiments the CMUTs are Poly-CMUTs.

In some embodiments the transducers are arranged in strips that extend along a surface of the support.

In some embodiments the support is formed with a bore that extends through the support and the transducers are located on an outer surface of the support.

In some embodiments the transducers include transducers that are disposed on a front portion of the outer surface of the support which is symmetrical about an axis of the bore. In some embodiments the front portion of the outer surface of the support comprises a cylindrical portion with a radiused front edge.

In some embodiments the transducers are arranged in a plurality of circumferentially spaced apart strips that extend longitudinally parallel to the axis of the bore. In some embodiments the strips curve around the radiused front edge such that some of the transducers face radially outward and some of the transducers face in an axial direction (e.g. a direction that is substantially axial relative to the bore). In some embodiments the apparatus comprises at least seven or at least eight of the circumferentially spaced apart strips.

In some embodiments the transducers are arranged such that the plurality of measured distances includes measured distances that are measured in directions that are radial relative to the bore and distances that are measured in directions that are axial relative to the bore and/or directions that are a combination of radial and axial relative to the bore.

In some embodiments the tool comprises a drill guide operable to guide a drill that is received in the bore.

In some embodiments the data processor comprises a state estimator having an input connected to receive the plurality of measured distances and an output comprising an updated estimated pose wherein the updated estimated pose is provided in real time or near real time.

In some embodiments the tool comprises a guide configured to constrain another tool to be moved along an axis defined by the guide.

In some embodiments the support is rotatable relative to the tool. In some embodiments the apparatus comprises an actuator for driving the support to rotate relative to the tool while the one or more signals are being generated.

In some embodiments the computational model of the object is adaptive and models one or more joints between different parts of the object and the data processing system is configured to estimate a current configuration of the one or more joints based on the plurality of measured distances.

In some embodiments the object is a portion of a patient's spine and the tool is a surgical tool operable to remove bone from the patient's spine.

Another aspect of the invention provides a method for localizing a tool relative to an object. The method comprises: operating range sensors on the support to measure a plurality of measured distances to points on a surface of the object. The support is integrated with or coupled to the tool. The tool may, for example, comprise a tool that may be used to directly alter the object (e.g. a reamer, chisel, saw, or the like) or a tool that functions to guide another tool. The guide may be configured, for example, to constrain the other tool to be moved along an axis defined by the guide. A drill guide is one example of a tool. The method uses a computational model of the object processing the plural measured distances to generate an estimated pose of the support relative to the object.

In some embodiments the method comprises periodically operating the range sensors to obtain a new plurality of measured distances and processing the new plurality of measured distances to update the estimated pose of the support relative to the object.

In some embodiments updating the estimated pose comprises: generating a plurality of estimated distances between the support and the object that respectively correspond to the plurality of measured distances using the computational model and the current estimated pose; calculating a measure of discrepancies between the measured distances and the estimated distances; and modifying the current estimated pose in a way that reduces the measure of discrepancies to yield the updated estimated pose.

In some embodiments modifying the current estimated pose comprises applying a multivariable optimization technique.

In some embodiments modifying the current estimated pose comprises applying a multivariable state estimation technique.

The following Detailed Description provides a wealth of additional examples and features that may be included in methods and apparatus as described herein. Another aspect of the invention provides apparatus having any new and inventive feature, combination of features, or sub-combination of features as described herein. Another aspect of the invention provides methods having any new and inventive steps, acts, combination of steps and/or acts or sub-combination of steps and/or acts as described herein.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

FIG. 6A is a perspective view of the drill guide. FIG. 6B is a magnified view of the end portion of the drill guide of FIG. 6A. FIG. 6C is a perspective view of the end portion of the drill guide of FIG. 6A showing a bore for receiving a drill bit. FIG. 6D is a perspective view of a drill guide like that of FIG. 6A positioned near a patient's vertebra with axes for distance measurements shown. FIG. 6E is a longitudinal section through a drill guide showing various dimensions. FIG. 6F is a transverse section through a drill guide showing various dimensions.

DEFINITIONS

Figure 1:
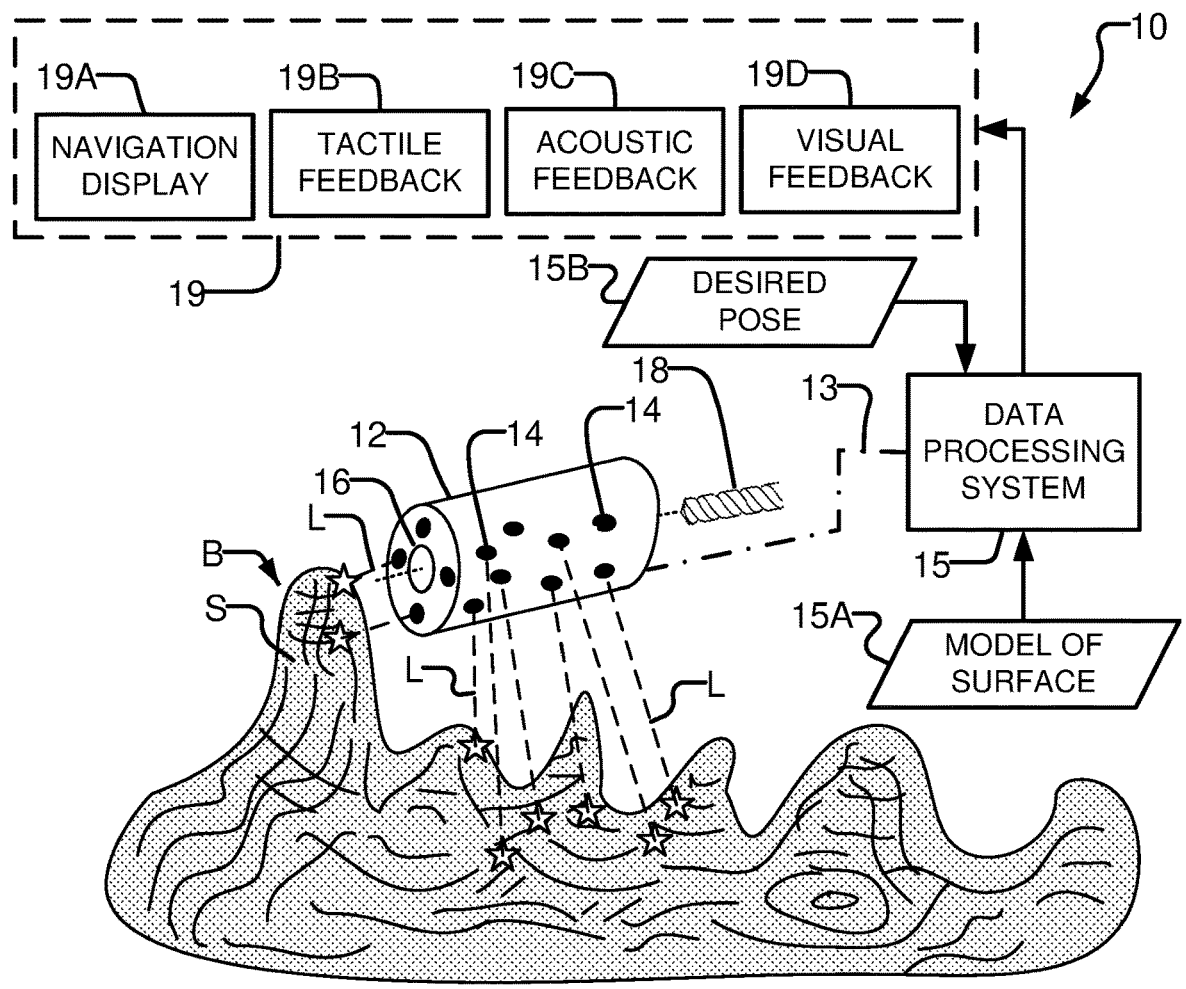
FIG. 1 is a schematic illustration of apparatus according to an example embodiment of the present technology.

"Pose" of an object means the location and orientation of the object. Pose is fully specified in 6 degrees of freedom. Pose may be expressed in various coordinate systems. For example, pose may be expressed in the form of three position coordinates (e.g. coordinates that identify a position of an object with reference to Cartesian axes) and three angular coordinates (e.g. coordinates indicating orientation of the object in terms of rotation about the coordinate axes). In some cases it is not necessary to fully specify pose of an object. For example, in some cases rotations about one axis may be irrelevant. In such cases "Pose" may optionally be specified with the irrelevant information omitted.

"Non-imaging" means without creating an image. For the purposes of this application a point cloud is not an image. Some embodiments or the present technology use non-imaging distance measurements to localize and track poses of tools.

"Near real time", in reference to tracking a tool or support, means establishing an updated pose of the tool or support in a small enough interval of time to not impede the surgical procedure or cause significant errors. In the context of this technology, updating a pose in a within a time that is on the order of 1 s or less can generally be considered to be "in near real time".

"Ultrasound" means acoustic waves having frequencies of 20 kHz and greater.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

One aspect of the present technology provides apparatus operable to track poses of tools relative to objects of interest. A tool may comprise a guide for another tool. The guide may, for example, constrain the other tool to move along a particular axis. An example of a tool is a drill guide which may be used to guide a drill bit (and example of another tool) to drill a hole into an object. The present technology may be operated to inform a user when the drill guide is positioned in a pose such that a drill guided by the drill guide will drill a hole that enters the object at a desired starting location and extends into the object from the starting location in a desired direction.

Other non-limiting examples of tools include: scalpels, ultrasonic scalpels, scrapers, reamers, saws, needles, cannulas, and so on.

In apparatus according to the present technology, range sensors such as ultrasound transducers may be integrated directly into tools or into supports that can be attached to tools. Echoes of ultrasound signals produced by the ultrasound transducers may be used to continuously register the tool to the surrounding anatomy. This approach may be described as "self-localization".

The accuracy with which the pose of a tool should be measured depends on the application. One example application of the present technology is drilling holes for pedicle screws in a patient's vertebrae. For this application an accuracy on the order of 1 mm is generally desired. Sub-millimeter accuracy can be beneficial.

FIG. 1 is a schematic diagram illustrating apparatus 10 according to a general embodiment of the present technology. Apparatus 10 comprises a support 12.

A plurality of range sensors 14 are distributed on support 12. Range sensors 14 are oriented to measure distances in different directions. The set of distances measured by the set of range sensors 14 correspond to a 3D point cloud that can be used to localize support 12 relative to surfaces that are located within the range of range sensors 14.

Support 12 may have any suitable size and form. In some non-limiting example embodiments, support 12 is one or more of: circularly symmetric; has a cylindrical, spherical, conical or planar surface; convex; concave; tapering; ellipsoidal; faceted; curvilinear; free form; and/or combinations of these. Range sensors 14 may be distributed on support 12 in any suitable arrangement.

In use, support 12 is placed adjacent to an object of interest, here generally described as a body B that has a non-planar surface S. Surface S may, for example have irregular projections, varying surface contours or the like. Body B may, for example be a bone or set of bones of a person. Surface S may, for example, be an outer surface of a bone or set of bones such as, for example, an outer surface of one or more vertebrae of a person's spinal column.

Range sensors 14 are operable individually and/or in conjunction with one another to measure a plurality of linear distances. Each of the linear distances is measured from a location that has a known position relative to support 12 (e.g. the location of a transducer or set of transducers of a range sensor 14) to surface S. Preferably, support 12 carries a sufficient number of range sensors 14 to obtain enough of the distance measurements to enough distinct points on surface S that the pose of support 12 relative to surface S can reliably be determined accurately enough for the intended application using the techniques described herein.

System 10 includes a data processing system 15. Data processing system 15 is operative to perform data processing as described herein. Data processing system 15 may, for example be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Data processing system 15 may, for example, comprise a stand-alone system, a network of cooperating data processors, a cloud-based data processing system or the like. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

Signals 13 from range sensors 14 are processed by data processing system to obtain multiple distance measurements. Each of the distance measurements corresponds to a distance from a corresponding reference point that has a known location relative to support 12 (e.g. a point on a transducer of a range sensor 14) to surface S along a corresponding line L that passes through the corresponding reference point and has a known orientation relative to support 12.

The form (shape) of surface S of body B is known. For example, where body B is a bone of a person, the 3D shape of body B may be determined by performing medical imaging such as magnetic resonance imaging ("MRI"), computed tomography imaging ("CT"), cone beam CT imaging ("CBCT"); positron emission tomography ("PET") or 3D-Ultrasound imaging ("3DUS"). The form of surface S may be represented by a computational model 15A accessible by data processor system 15. The computational model may be obtained by processing 3D image data. In some embodiments the 3D image data is represented in a Dicom format. In some embodiments the computational model is derived by steps that include segmenting the 3D image based on density (which may be represented in Hounsfield units) to select portions of the 3D image data that correspond to body B. For example, a density threshold may be selected to discriminate between bone and soft tissues. A threshold based segmenter may then be used to produce a model of the bone surface.

Computational model 15A may have any suitable data format. In some embodiments, computational model 15A is a STL file. Other example file formats that may be used to store a computational model 15A include .obj, .ply, .step, 3DS, .collada, .and .gITF file formats.

The pose (position and orientation) of support 12 relative to body B may be determined by processing the distance measurements obtained from range sensors 14 together with the known locations relative to support 12 of the reference points and lines L corresponding to each distance measurement (this information may be represented by a point cloud) and the known configuration of surface S. This processing may be performed by data processing system 15. Examples of processing are provided elsewhere herein.

Apparatus 10 may be configured to track changes in the pose of support 12 continuously in real time or near real time. Signals 13 encoding new distance measurements may be obtained from range sensors 14 at a rate sufficient to track the pose of support 12 relative to body B as support 12 is moved.

Support 12 is configured to define an orientation or position and orientation of a tool 18. Support 12 may be integrated with (i.e. be part of) tool 18 or coupled to or affixed to tool 18. The tool 18 may be a tool, such as a drill guide, which is configured to constrain the motion of another tool. The pose of tool 18 or another tool guided by tool 18 is therefore directly related to the pose of support 12.

In some embodiments, apparatus 10 comprises a guide 16 configured to hold tool 18 at a known orientation relative to support 12. For example, a drill guide may be defined by or affixed to support 12. The drill guide may hold a drill bit to lie along a centerline that has a known relationship to support 12. Since the orientation of support 12 relative to body B can be determined and tracked as discussed above and the relationship of the centerline defined by the drill guide to support 12 is known, the point(s) at which the centerline intersects surface(s) of body B and the orientation of the centerline relative to body B may be determined and tracked. Where the drill guide constrains the pose of the drill bit so that the axis of the drill bit lies on the centerline the position at which the drill bit will enter body B and the trajectory that the drill bit will follow when the drill bit is advanced axially relative to the drill guide to drill into body B are both known to a level of precision that depends on the accuracy with which the pose of the drill guide is measured by apparatus 10.

Apparatus 10 includes one or more user feedback interfaces 19 that communicate to a user the current pose of a tool 18 relative to body B. User feedback interface(s) 19 may, for example include one or more navigation displays 19A that provide graphical feedback, haptic or tactile feedback devices 19B (e.g. devices that deliver vibrations to a portion of tool 18 or support 12 grasped by a user), acoustic feedback devices 19C, and/or visual feedback devices 19D (e.g. arrows, compass needles, lights or other indicators located on tool 18 or support 12 or elsewhere that indicate a way to manipulate tool 18, support 12 to achieve a desired pose for applying tool 18).

In some embodiments user feedback interface(s) 19 indicate a relationship between a desired pose of tool 18 and the pose of tool 18 as determined by data processing system 15. The desired pose may, for example be represented by data 15B stored in a data store accessible to data processing system 15. The desired pose may be stored as part of an operation plan. Each of the model and/or the operation plan may be created in advance or intraoperatively.

For example, user feedback interfaces 19 may provide feedback to a user that indicates whether or not the axis of a drill supported by a guide 16 is aligned with a desired trajectory for drilling into body B starting at a desired entry point.

Figure 2:
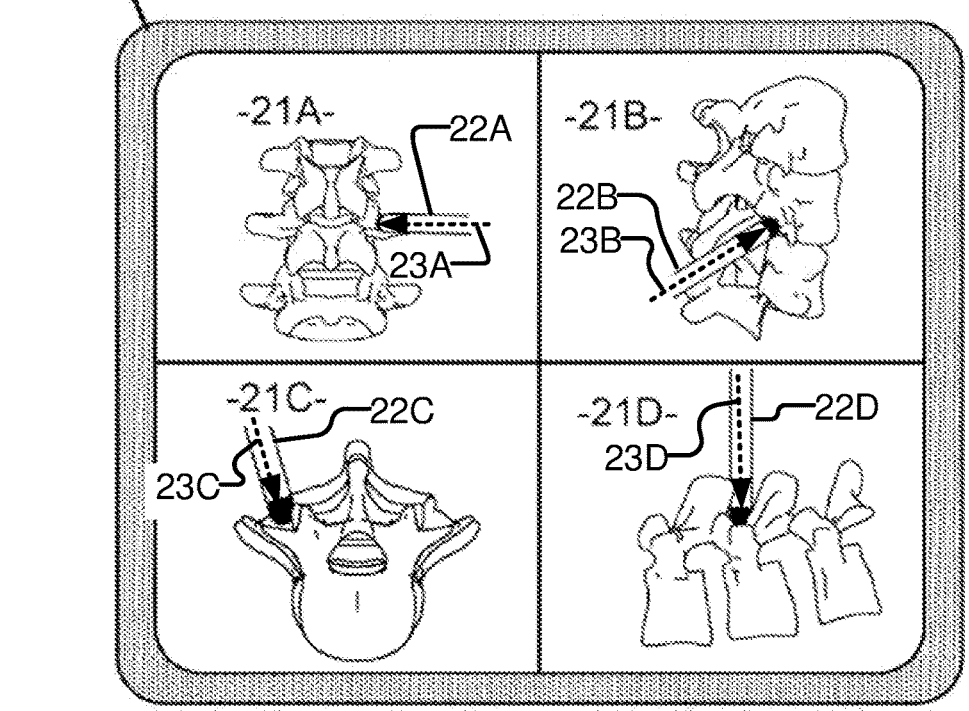
FIG. 2 is a front view of an example navigation display.

FIG. 2 is a schematic view of an example navigation display 19A that displays an image 20 that includes depictions 21 of body B from two or more angles. In some embodiments, image 20 includes three orthogonal views of body B together with indicia showing the currently estimated pose of tool 18. The orthogonal views may, for example, be generated using the 3D Slicer Image Computing Platform software.

When apparatus 10 is being used in a surgical setting the views may correspond to anatomical planes. The views of body B may be based on preoperative imaging. In some embodiments image 20 comprises a perspective view of a 3D model of tool 18 shown relative to a 3D segmented model of body B. Which views are displayed in a navigation display, if present, and how many views to include in a navigation display may be varied by design and/or by user controls.

Non limiting example depictions 21A, 21B, 21C and 21D are shown in FIG. 2. Depiction 21A is a coronal plane view of body B. Depiction 21B is a perspective view of body B. Depiction 21C is a transverse plane view of body B. depiction 21D is a sagittal plane view of body B. A perspective view may, for example, be a perspective view of a 3D model of tool 18 shown relative to a 3D segmented model of body B (e.g. a 3D rendering of segmented bones of a patient's spine) relative to a model of tool 18).

Associated with each depiction 21 is an indicia 22 showing a desired trajectory for drilling into body B (indicia 22A through 22D are shown in FIG. 2). Also associated with each depiction 21 is an indicia 23 which shows the current pose of a drill 18A relative to body B (indicia 23A through 23D are shown in FIG. 2).

A user may position drill 18A so that indicia 22 and 23 are aligned in each pane of image 20. The user then knows that drill 18A is correctly positioned to drill into body B along the desired trajectory.

Registration

The pose of support 12 relative to body B may be determined by performing a registration procedure. The fundamental problem of estimating the pose of support 12 may be formulated as how to process distance measurements obtained by range sensors 14 in order to determine the pose of support 12 (and thereby tool 18) relative to body B (e.g. a target vertebra). The pose of support 12 may, be described by a state vector, $\vec{x}$ which may contain a six-parameter representation of the location in space and attitude (orientation in space) of support 12 (or tool 18). For example three parameters may specify the location of support 12 in a frame of reference (e.g. a Cartesian or other coordinate system) and three parameters may specify the attitude of support 12 (e.g. in terms of pitch, yaw and roll relative to a reference attitude). Various alternative representations are possible. Other representations may, for example, represent attitude in terms of quaternions or homogeneous transforms.

The registration procedure may comprise performing an optimization. The optimization may commence with an initial estimate of the current pose of support 12 relative to body B. The estimated pose may be expressed in any suitable system of coordinates. The initial estimated pose may be a guess.

The optimization may proceed to iteratively modify the estimated pose (by altering estimated values of the coordinates specifying the pose of support 12) to find coordinate values which minimize a cost function (which may also be called an objective function). The cost function may compare distances to surface S of body B measured by range sensors 14 to corresponding simulated measurements of corresponding distances calculated based on the assumption that the currently estimated pose is correct.

An alternative form of cost function considers a point cloud based on the distance measurements and the associated direction of each measurement. The cost function is based on the residual distance from each point in the point cloud to the closest point on surface S. The cost function may, for example comprise a sum or weighted sum of the residual distances or the residual distances raised to some power. This result may be divided by the number of points in the point cloud.

In some embodiments, for a distance measurement or simulated distance measurement to be considered valid, the distance measurement or simulated distance measurement must have a value that does not exceed a range threshold $d_{lim}$. Range threshold $d_{lim}$ may be chosen so that for ranges less than the range threshold, uncertainties of the measured values are below an uncertainty threshold. The value of $d_{lim}$ may be selected to exclude measurements over distances for which the measurements are considered to be not sufficiently accurate.

The simulated measurements $\hat{y}_j$ may, for example, be considered to be outputs of a nonlinear function $h_j(\vec{x})$ which has a value such that the distance from the jth individual transducer element to the nearest part of surface S is given by:

$$\hat{y}_j = h_j(\vec{x}) \tag{1}$$

In some embodiments $h_j(\vec{x})$ takes on a numerical value if the calculated distance to surface S from a transducer of a range sensor 14 measured along a direction perpendicular to the face of the corresponding transducer does not exceed range threshold $d_{lim}$.

In some embodiments, if the calculated distance exceeds $d_{lim}$ (or if the perpendicular extending from the transducer does not intersect surface S) then the value of $h_j(\vec{x})$ is identified as being out of range or invalid, for example by assigning the value "Not a Number" (NaN).

In an ideal case where the distance measurements have no errors the results of the actual measurements and the corresponding simulated measurements would match exactly when the estimated pose is correct. In the real world, the measured distances will include errors.

In some embodiments, optimization to estimate a current pose of support 12 relative to body B attempts to minimize the following cost function:

$$O = \frac{\sum_{j=1}^{N} \|y_j - \hat{y}_j\|^{\alpha}}{N} \tag{2}$$

where, O is the value of the cost function, N is the number of valid distance measurements (e.g. the number of distances obtained from range sensors 14 that fall within a defined range—e.g. the range 0 to $d_{lim}$), j is an index having a value in the range of 1 to N, $y_j$ is the $j^{th}$ one of the N distance values that correspond to valid distance measurements, $\hat{y}_j$ is a value of a simulated distance measurement that corresponds to $y_j$ and is calculated from the current pose estimate, and a is an exponent that may have the value 1 or another value selected to adjust the sensitivity of the cost function to individual cases where corresponding values of $\hat{y}_j$ and $y_j$ are significantly different.

The cost function of Eqn. (2) may be varied, for example, by applying different weights for the differences between the actual and simulated measurements for different values of j, raising the absolute values of the differences between the actual and simulated measurements to some power α, changing the criteria for valid measurements (e.g. the value of $d_{lim}$), etc.

N may vary over time based on measurements that may be missing or have values that are large enough that they are not considered to be reliable. The above objective function only considers points where distance measurements were obtained and heavily penalizes estimated positions that omit distance measurements not predicted by the simulation but that were collected in the vector y of measured distances. These qualities help to drive the estimated pose toward the true pose of support 12/tool 18.

An alternative example cost function may be expressed as:

$$O' = \frac{\sum_{j=1}^{N} \|r_j\|^\alpha}{N} \quad (3A)$$

where, O' is the value of the cost function, $r_j$ are the residual distances described above, and j, N, and α are defined above.

The optimization may be performed using any suitable optimization algorithm. Example optimization algorithms that may be applied include: point-set registration; constrained interior-point algorithms; interior point methods (e.g. singular, constrained or unconstrained); global search methods; iterative closest point (ICP) methods; robust point matching (RPM) methods; kernel correlation methods; coherent point drift (CPD) methods; sorting the correspondence space (SCS) methods; and machine learning techniques (e.g. providing the distances measured by range sensors 14 as inputs to a machine learning model trained to output an estimate of the pose of support 12 relative to body B). Machine learning methods may, for example, use one or more: trained convolutional neural networks (CNNs); sequential CNNs. Machine learning models may be based on architectures such as DenseNet; PointNet; U-Net; or the like. A multi-start interior-point optimization was found to perform well in proof of principle experiments.

Cost functions such as defined in Eqn. (2) or (2A) may have, and typically do have, local minima. The existence of plural local minima can cause some optimization algorithms to fail to converge. Some embodiments apply global optimization techniques such as genetic algorithms, simulated annealing, and particle swarm optimization to estimate the pose of a support 12/tool 18. Global optimization techniques can be more likely to converge than non-global optimization algorithms despite the possibility of there being local minima. For example, multi-start or more advanced global optimization techniques may be used to find a pose that minimizes the cost function, possibly at the cost of longer run-times.

Experiments by the inventors have shown that the optimization can converge to the true relative position of support 12 and body B even when the initial guess is off by a few centimeters.

In some embodiments the time required to achieve convergence of the registration process is reduced by running several instances of the registration process in parallel with each of the instances starting using a different initial estimate of the current pose of support 12. For example, the registration process may comprise running four to eight parallel instances of the registration process each having a different initial estimate of the starting pose of support 12.

Performing a registration procedure to estimate a pose of support 12 relative to body B may be computationally intensive. Depending upon the computational resources of data processor system 15, data processor system 15 may be too slow to repeat the registration procedure sufficiently rapidly to track changes in the pose of tool 18 in real time. In some embodiments data processor system 15 is configured to use the pose estimated by the registration process as the initial pose in a tracking algorithm that can be faster than the algorithm used for initial registration.

For example, tracking may be performed using any of a variety of known nonlinear state-estimators. Examples of nonlinear state estimators are: unscented Kalman filter (UKF), extended Kalman filter (EKF), particle filter (PF); moving horizon estimation; etc. Tracking may also or in the alternative be performed using an optimization based algorithm that is optimized for speed. In some embodiments, the speed of the algorithm used for tracking after initial registration has been performed is increased by using a data set (e.g. a subset of the point cloud used for registration) that is smaller than the dataset used in the initial registration.

Apparatus 10 may be configured to obtain new distance measurements at a rate sufficient to track the pose of a support 12/tool 18 in real time or near real time. For example apparatus 10 may be configured to acquire new sets of distance measurements at a rate in excess of 5 Hz (e.g. a rate in the range of 5 Hz or 10 Hz to 120 Hz. or more).

Data processor system 15 may perform optimization-based registration and state-estimator tracking in parallel. The state estimator tracking may follow ongoing positional movements of tool 18 while the registration process may be run to periodically update the ground truth pose of tool 18 relative to body B.

The UKF algorithm compares measured distances and simulated measurements of distances in order to estimate a new positional mean and covariance of the pose of support 12 relative to surface S. The UKF algorithm is typically faster than the registration process and can accommodate movements of support 12 from frame to frame (i.e. between acquiring sequential sets of measurements from range sensors 14). The UKF typically has a smaller zone of convergence than the registration process. Using a registration process as described above in parallel with a state estimator such as a UKF facilitates both accuracy and sufficient tracking speed.

Accurate measurements of the position of support 12 relative to surface S may be obtained even if individual measurements by range sensors 14 include errors, particularly where the errors are distributed according to an error distribution (e.g. a Gaussian distribution) for which the average measurement error is zero or other known value. Optimization may be performed using a larger number of distances than would be required for the registration in the case of no measurement error.

The inventors consider that, typically:
- designs of apparatus 10 that include more transducers capturing valid signals will tend to localize support 12/tool 18 more accurately and with greater noise tolerance than designs that include fewer transducers that capture valid signals.
- designs of apparatus 10 that capture a greater number of distance measurements to local features of surface S, such as designs which make distance measurements in directions that fan out, tend to outperform designs that make distance measurements to fewer local features of surface S (e.g. by making plural measurements to the same local features of surface S).

To facilitate making simulated measurements of distances between range sensors 14 on support 12 and body B, apparatus 10 may include a computational model of body B (e.g. a computational model of a relevant part of a patient's anatomy). The computational model may be derived from medical images. For example, bone surfaces may be segmented from a preoperative 3D scan based on intensity values. The bone surfaces may then be processed to generate a mesh that represents the bone surfaces (e.g. a triangular mesh that is made up of triangular elements). The computational model may take various forms. For example, the computational model may comprise a triangular mesh, volume-point definition or point cloud which models surface S of body B.

In some embodiments the computational model of body B is adaptive. An adaptive computational model is applicable in cases where the configuration of body B can change. For example, body B may comprise a plurality of rigid segments connected by joints (e.g. a plurality of vertebrae which permit constrained relative motion of the rigid segments. The adaptive computational model represents surface S for a range of allowed configurations of the joints. In some embodiments, an optimization performed during the registration process estimates current relative positions of rigid segments of body B. In some embodiments the possible configurations of body B considered by the optimization are limited by predetermined constraints on the range of motion of joints of body B. For example, where body B is a portion of a patient's spine made up of two or more vertebrae, the optimization may optimize for angles of relative rotation and/or flexion of joints between the vertebrae within predefined ranges of motion.

As another example, body B may be modified after the computational model of body B is created. For example, a surgeon may cut off a part of body B as part of a surgical procedure. The computational model may adapt to this change by being updated to reflect the modified geometry of body B. In some embodiments, apparatus 10 is configured to determine the new form of body B by tracking one or more tools that are used to modify body B. For example, a cut plane produced by a saw may be added to the adaptive model based on a pose of the saw while the cut was being made.

Range sensors 14 may be implemented using various technologies. In some embodiments, range sensors 14 comprise ultrasound sensors. In some embodiments the ultrasound sensors are operated in a non-imaging mode. The ultrasound sensors may, for example, emit ultrasound having a frequency in the range of about 4 MHz to about 15 MHz for surgical applications.

Ultrasound sensors may utilize ultrasound transducers of various types. For example, in some embodiments the ultrasound transducers comprise capacitive micromachined ultrasonic transducers ("CMUTs"). In some embodiments the CMUTs are polymer based ("poly-CMUTs"). Poly-CMUTs are described, for example, in Gerardo, C. D., Cretu, E., & Rohling, R. (2018). Fabrication and testing of polymer-based capacitive micromachined ultrasound transducers for medical imaging. *Microsystems and Nanoengineering*, 4(1). (2018) https://doi.org/10.1038/s41378-018-0022-5, which is hereby incorporated herein by reference for all purposes. In some embodiments the ultrasound transducers are piezoelectric transducers.

Other types of ultrasound transducer such as silicon-based CMUTs ("Si-CMUTs") may also be used.

Figure 3A:
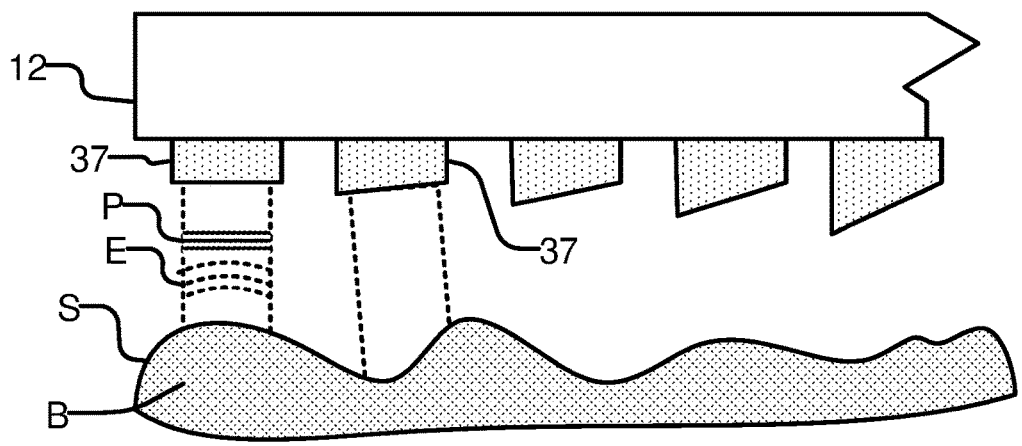
FIGS. 3A and 3B are schematic views that illustrate example non-imaging ultrasound range finding techniques.

FIG. 3A is a schematic illustration showing a support 12 that carries an array of ultrasound transducers 37 which are operated individually as range sensors 14. Each ultrasound transducer 37 may be controlled to emit a pulse P of ultrasound. In the near field the ultrasound pulse travels in a straight line until it encounters surface S. Energy E from the ultrasound pulse is scattered by surface S. Some of the scattered energy is received by the ultrasound transducer 37. The distance between the surface of the ultrasound transducer 37 and surface S may be determined by the time difference between transmission of pulse P and reception of scattered energy E.

Figure 3B:
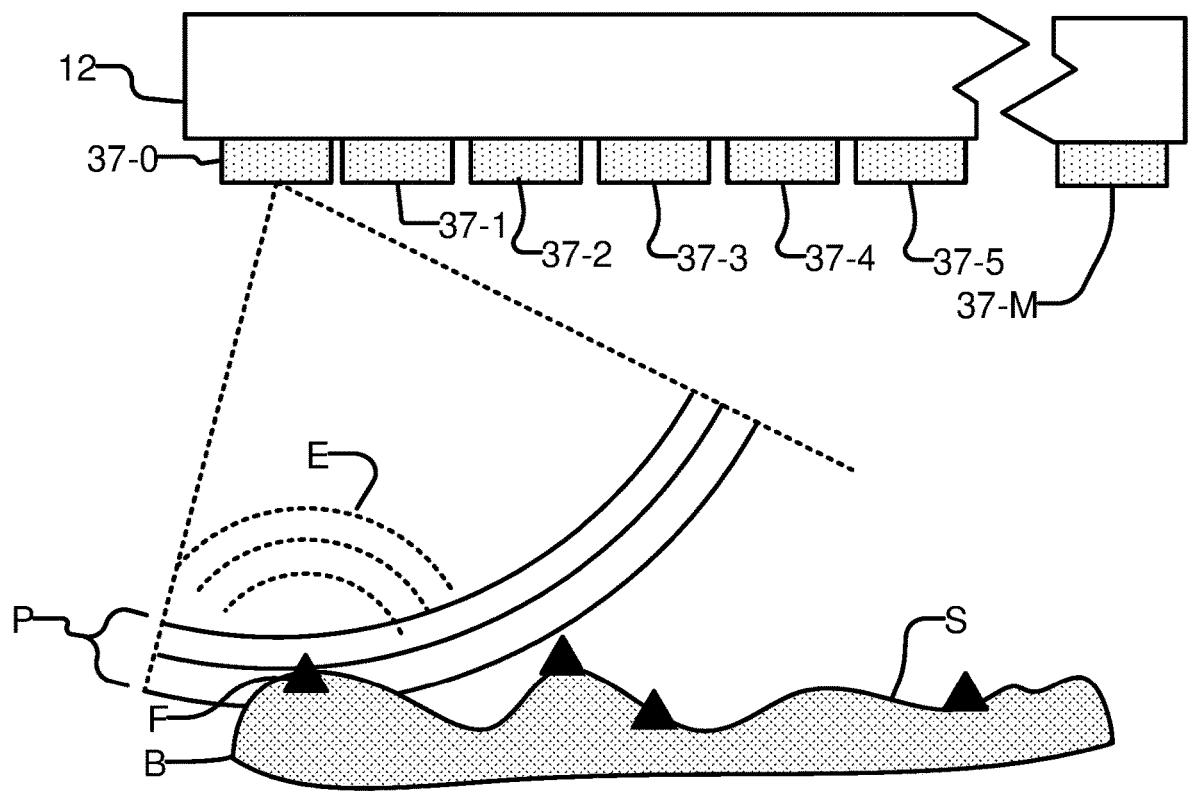

FIG. 3B is a schematic illustration showing another example arrangement of ultrasound elements 37 (individually labelled 37-1, 37-2, . . . , 37-M) located in proximity to a surface S. In this example, ultrasound elements 37 are arranged in a linear array. An ultrasound pulse P is emitted from one of ultrasound elements 37 (in this case element 37-1). Pulse P propagates outward at the speed of sound (typically about 1500 m/s). When pulse P is incident at a feature F on surface S which scatters ultrasound, pulse P is scattered as scattered pulse E. Some energy from scattered pulse E is directed toward other ones of elements 37 which are operated to detect ultrasound energy. The time at which scattered pulse E is received at any one of ultrasound elements 37 depends on the total path length from the transmitting element (37-1) to the feature F on surface S at which pulse P was scattered to the receiving element 37. The path length affects the time difference between the time at which pulse P was transmitted and the time that scattered pulse E is detected at a specific ultrasound element 37.

Since the relative locations of elements 37 are known, from the time difference between transmission of pulse P and detection at a receiving element 37 of ultrasound from pulse P, one can determine for each receiving ultrasound element 37 a curve or curved surface containing of possible locations at which pulse P was scattered by feature F. The locations of features F on surface S relative to support 12 may be determined by finding the locations where the curves or curved surfaces corresponding to a plurality of the receiving ultrasound elements 37 overlap.

Figure 4:
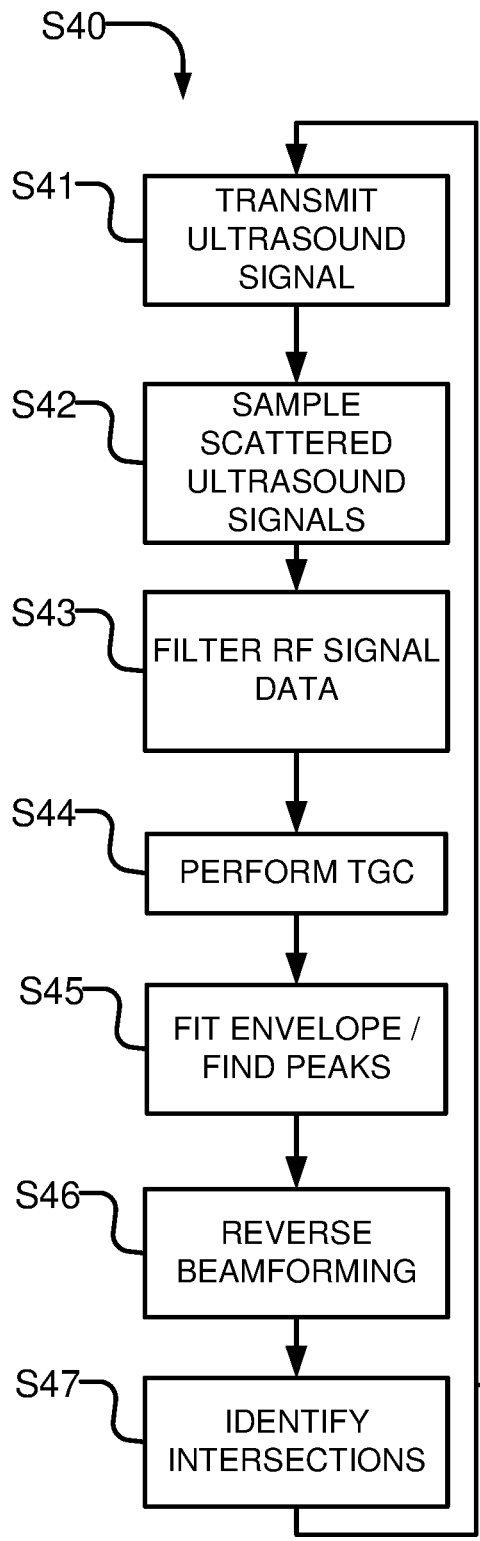
FIG. 4 is a flow chart of an example range finding method.

FIG. 4 is a flow chart that illustrates an example process S40 which takes as input RF data from ultrasound sensors to yield distance measurements to a hard surface (e.g. surface S) within a field of interest. Method S40 uses the approach illustrated in FIG. 3B. The hard surface is a boundary where the acoustic impedance suddenly changes such that ultrasound is reflected.

In block S41 an ultrasound signal is transmitted. The ultrasound signal may be a pulse. In some embodiments the pulse is transmitted from a point source. In some embodiments the pulse is transmitted from a cluster of two or more transducer elements. Transmitting using plural transducer elements can generate pulses having higher power levels than pulses transmitted using a single transducer element.

In block S42, ultrasound signals arising from scattered ultrasound energy E are sampled at each of a plurality of elements 37 to obtain RF signal data. In block S43 the RF signal data is filtered for a frequency or frequencies of interest (e.g. a frequency or band of frequencies or set of frequencies present in the ultrasound signals transmitted at block S41). In block S44, time-gain compensation (TGC) is performed on the filtered signal from block S43.

In block S45, an envelope (e.g. a Hilbert envelope) is fit to the filtered signal. A peak detection algorithm is then used to identify any peaks In the envelope. Such peaks correspond to candidates for ultrasound signals that have been reflected/scattered from features F of surface S.

In block S46, a reverse beam forming method places radii on the 2D plane which includes elements 37. Reverse beamforming is the inverse problem to delay-and-sum beamforming. In delay- and sum-beamforming the problem is to determine delays to apply to different transducer elements to direct ultrasound to a specified location. In reverse beamforming the delays are known and the problem is to determine the location from which ultrasound was scattered. Each peak in the ultrasound signal detected at an ultrasound element 37 corresponds to an ellipse which passes through those scattering locations for which the ultrasound propagation time to the element 37 via any of the scattering locations correspond to the time of arrival of the peak at the element 37. The radii from each ultrasound element 37 extend to the corresponding ellipses.

Block S47 identifies overlaps of these radii (i.e. points where ellipses corresponding to plural ones of ultrasound elements 37 intersect). These points correspond to features F of hard surfaces at which ultrasound is reflected/scattered (e.g. portions of surface S, such as bone surfaces).

Since the location (distance and direction) of each of the points relative to support 12 is known, the set of points forms a point cloud. Registration of support 12 to body B may be determined using the coordinates of the points in the point cloud relative to support 12 and the known configuration of surface S. Method S40 may be repeated as indicated by loop S48 to allow the pose of support 12/tool 18 to be tracked.

Other example ways to use ultrasound to sense distances from support 12 to points on surface S of body B include:
  controlling arrays of ultrasound transducers to scan for hard (e.g. bone) surfaces. For example, controlling ultrasound transducers on support 12 to perform B-mode imaging of surface S. Resulting images may be segmented to locate surface S. Distances to surface S in different directions in the plane of the B-mode image may then be measured from the B-mode image. In some embodiments, trained machine learning models (e.g. regression networks) are configured to receive B-mode images as inputs and to output the distance measurements, point clouds based on the B-mode images and/or segmentation of body B as outputs;
  emitting ultrasound outward from support 12 in a side ranging configuration, forward facing configuration or a combination of these and detecting resulting reflected/scattered ultrasound;
  performing distance measurements using individual transducer elements or sets of transducer elements operating in the near field (e.g. as illustrated in FIG. 3A).

In some embodiments range sensors 14 comprise ultrasound range sensors operate at a wavelength such that surface S is in the near field relative to the transducers of the ultrasound sensors that transmit ultrasound toward surface S. The near field may, for example be defined as a distance not exceeding N given by:

$$N = \frac{A}{\pi \lambda} \tag{4}$$

where A is the area of the transducer and λ is the wavelength of the ultrasound.

In some such embodiments, each transducer may transmit an ultrasound pulse that propagates linearly away from the transducer. Most of the energy of the ultrasound pulse is concentrated in a columnar volume that extends away from the transducer in a direction normal to a face of the transducer. When the ultrasound pulse is reflected/scattered at surface S, at least some of the energy of the ultrasound pulse is returned toward the transducer and detected. Distance from the transducer to surface S may be computed from the round trip time of flight of the ultrasound pulse.

Different ultrasound transducers may be oriented in different directions (see e.g. FIG. 3A). For example, some ultrasound transducers may face in radial outward directions and other ultrasound transducers may face in a direction that has both radial and axial components. The angle at which ultrasound transducers face relative to a radial direction may be specified by some function. In some embodiments orientations of ultrasound transducers are determined by a form of a support 12 on which the ultrasound transducers are located. A strip or row of ultrasound transducers may, for example, follow the profile of a surface of support 12. As a result, an orientation of each of the transducers in the strip or row may be aligned with or have a fixed relationship to a direction normal to the surface of the support 12 at the location of the transducer.

In some embodiments, a transducer at one end of an array faces forward (e.g. in an axial direction) and a transducer at an opposing end of the array is directed laterally (e.g. radially outward). The orientations of transducers intermediate between the end transducers may be determined by interpolating using a function such as a polynomial of a selected degree (1, 2, 3 etc.), a trigonometric function, or another suitable interpolation function.

For example, where a strip of transducers includes T transducers identified by an index in the range of 0 to T−1 which is 0 for the transducer element farthest from the front end of support 12 (e.g. the outer surface of a drill guide) and increases toward the front end of the support 12. Each transducer in the strip may be inclined toward the front end of the support at an angle $\theta_i$ relative to the axial direction defined by:

$$\theta_{i, i=0, T-1} = \frac{\pi}{2}\left[1 - \left(\frac{i}{T-1}\right)^\beta\right] \tag{5}$$

The exponent β controls how evenly distributed the differences in angle of adjacent elements are distributed over the length of the array. Where β=1 the difference in angle between each pair of adjacent elements is the same. In some embodiments β=2. Eqn. 5 provides the simplest polynomial that can fulfill the boundary conditions.

In an example application a user (e.g. a surgeon) may use apparatus 10 as described herein to guide a tool 18 to modify body B based on feedback from a user feedback interface 19. Apparatus 10 may perform continuous tracking of tool 18 and ongoing updating of the registration that underlies the tracking.

Figure 5:
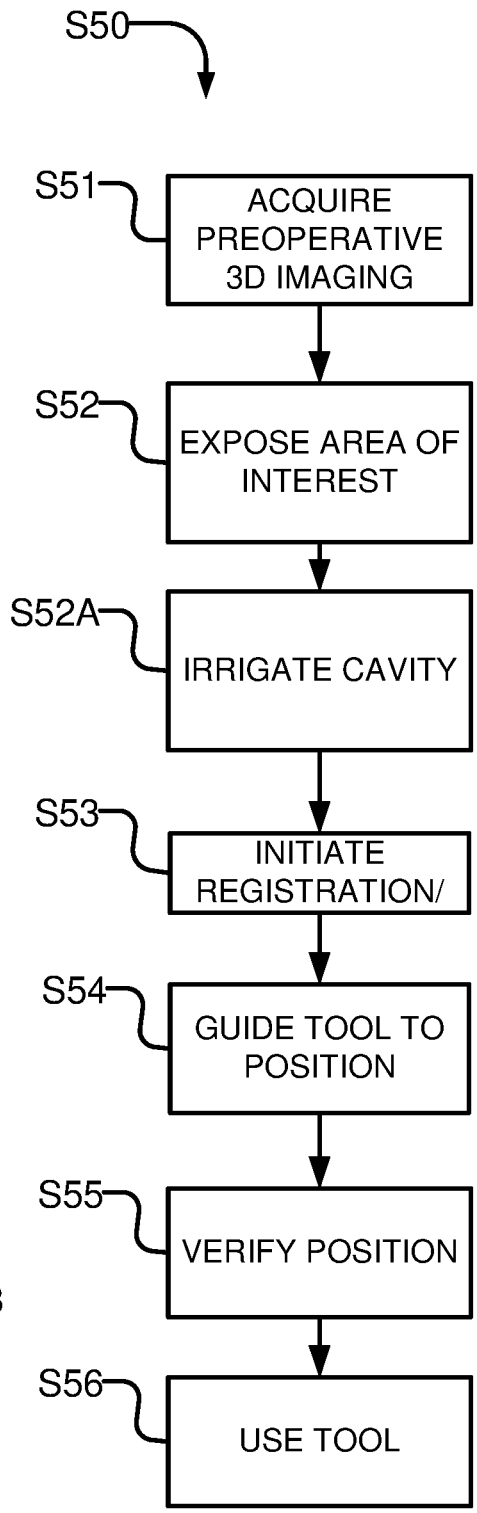
FIG. 5 is a flow chart illustrating an example method of surgical navigation.

FIG. 5 is a flow chart that illustrates an example workflow S50 for using an example embodiment of the present technology for positioning a tool to perform a surgical procedure (e.g. drilling a hole to receive a pedicle screw).

At block S51 a 3D scan of at least an area of interest of the patient is acquired preoperatively. At block S52, intraoperatively, the area of interest is exposed up to near the boney surface of interest (in some cases this exposure may be minimally invasive or percutaneous). Irrigation may be added to the cavity in order to assist accurate ultrasonic range-finding as indicated by block S52A.

At block S53, a self-localizing tool as described herein is placed near the bony landmark and held relatively still at a nominal pose, for example a pose corresponding to a tool position and orientation relative to anatomical landmarks recommended for freehand guidance, while an initial registration is performed.

At block S54, a tracking algorithm then guides the surgeon to place the tool in a desired position based on feedback from a user feedback interface such as a navigational display.

At block S55, the surgeon reverifies the position of the tool and potential trajectories of instrumented hardware. At block S56 the operative interaction with the bone (e.g. drilling a hole through the bone along the trajectory to a desired depth) is performed.

Figure 6A:
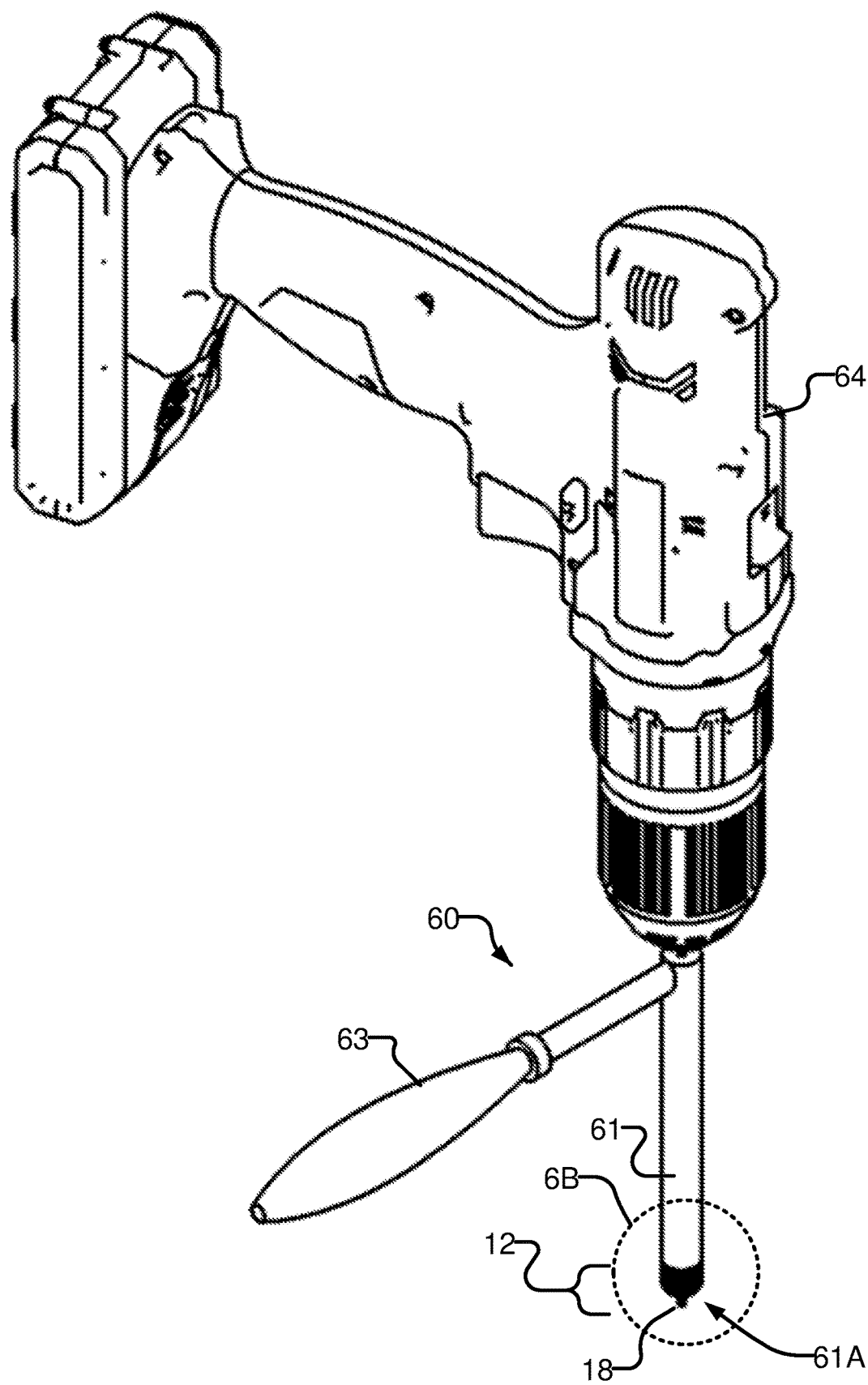
FIGS. 6A to 6F illustrate an example drill guide.

FIG. 6A shows a drill guide 60 according to an example embodiment. Drill guide 60 may, for example, be used for placing pedicle screws. Drill guide 60 comprises a cylindrical cannula 61 that has a curved nose portion 61A that serves as support 12 and a bore 61B (See FIG. 6C) dimensioned to receive and guide a tool 18 such as a drill bit. A handle 63 is provided for steadying drill guide 60. Tool 18 is connected to be driven by a power drill 64.

Figure 6B:
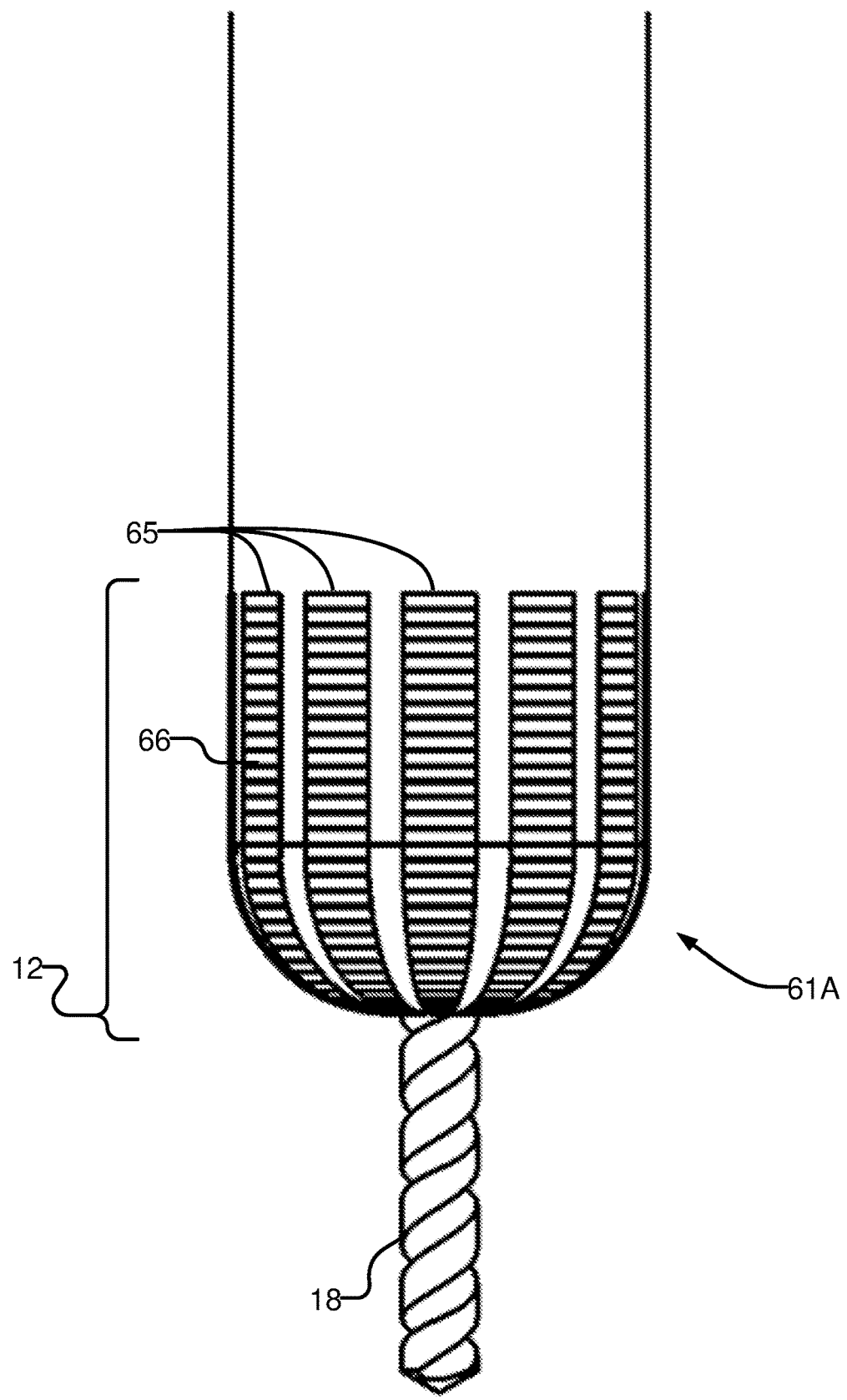
Figure 6C:
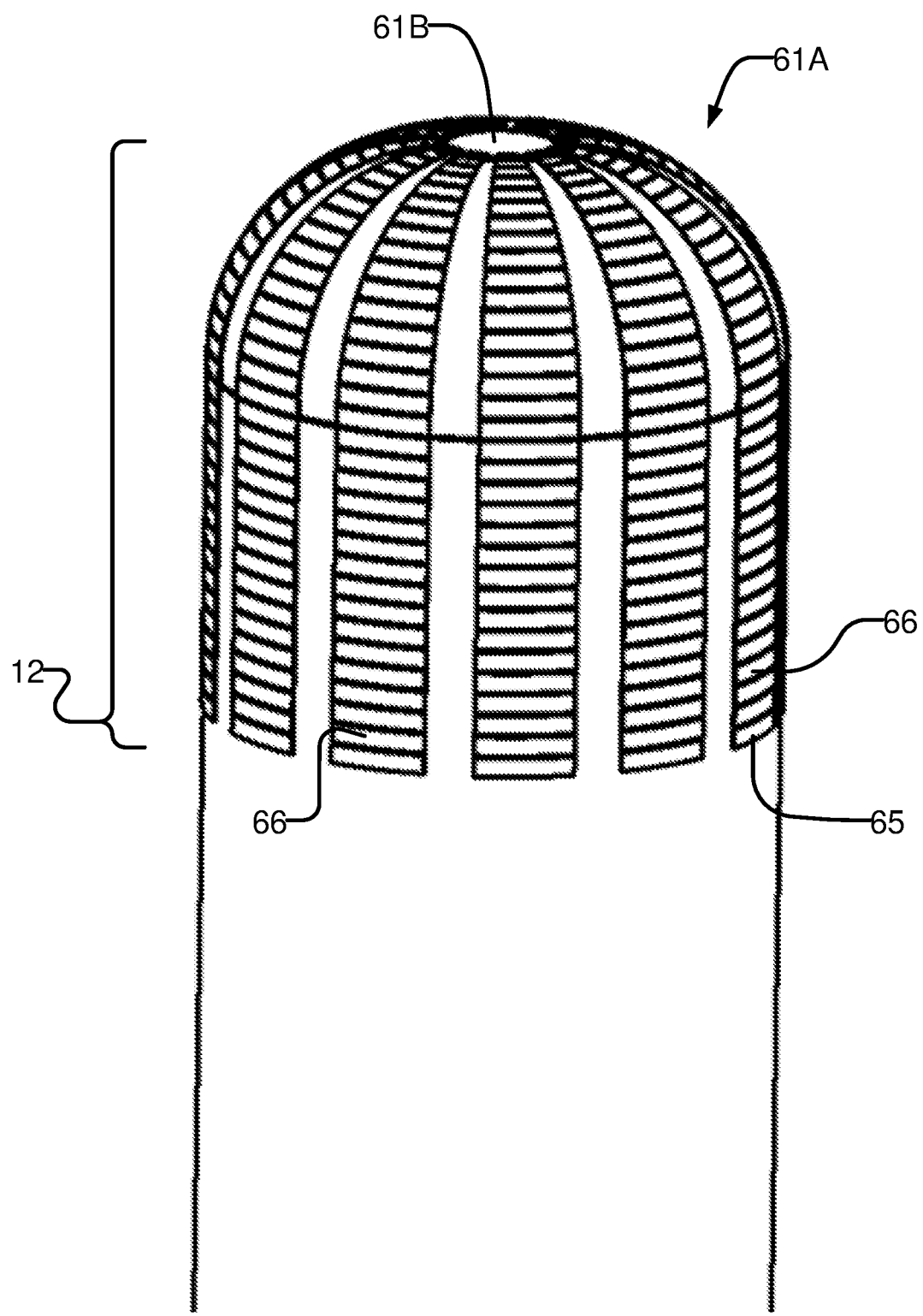

An example configuration of nose portion 61A of drill guide 60 is shown in greater detail in FIGS. 6B and 6C. Plural strips 65 of ultrasound elements 66 extend longitudinally along cannula 61 and wrap around onto nose 61A. Drill guide 60 includes ten circumferentially spaced apart strips 65. The number of strips 65 may be varied. Some embodiments have at least seven circumferentially spaced apart strips 65. Some embodiments have at least eight circumferentially spaced apart strips 65.

As can be seen in FIGS. 6B and 6C, strips 65 become closer together as they converge toward bore 61B. Depending on the dimensions of cannula 61, the number of strips 65, the width of strips 65 and the form of nose portion 61A there will be a limit to the number of ultrasound elements 66 of a given size that can be accommodated in the portion of each strip 65 that curves around nose portion 61 without the ends of adjacent strips 65 overlapping or extending past the edge of bore 61B. This factor can be taken into account when designing a drill guide 60.

Figure 6D:
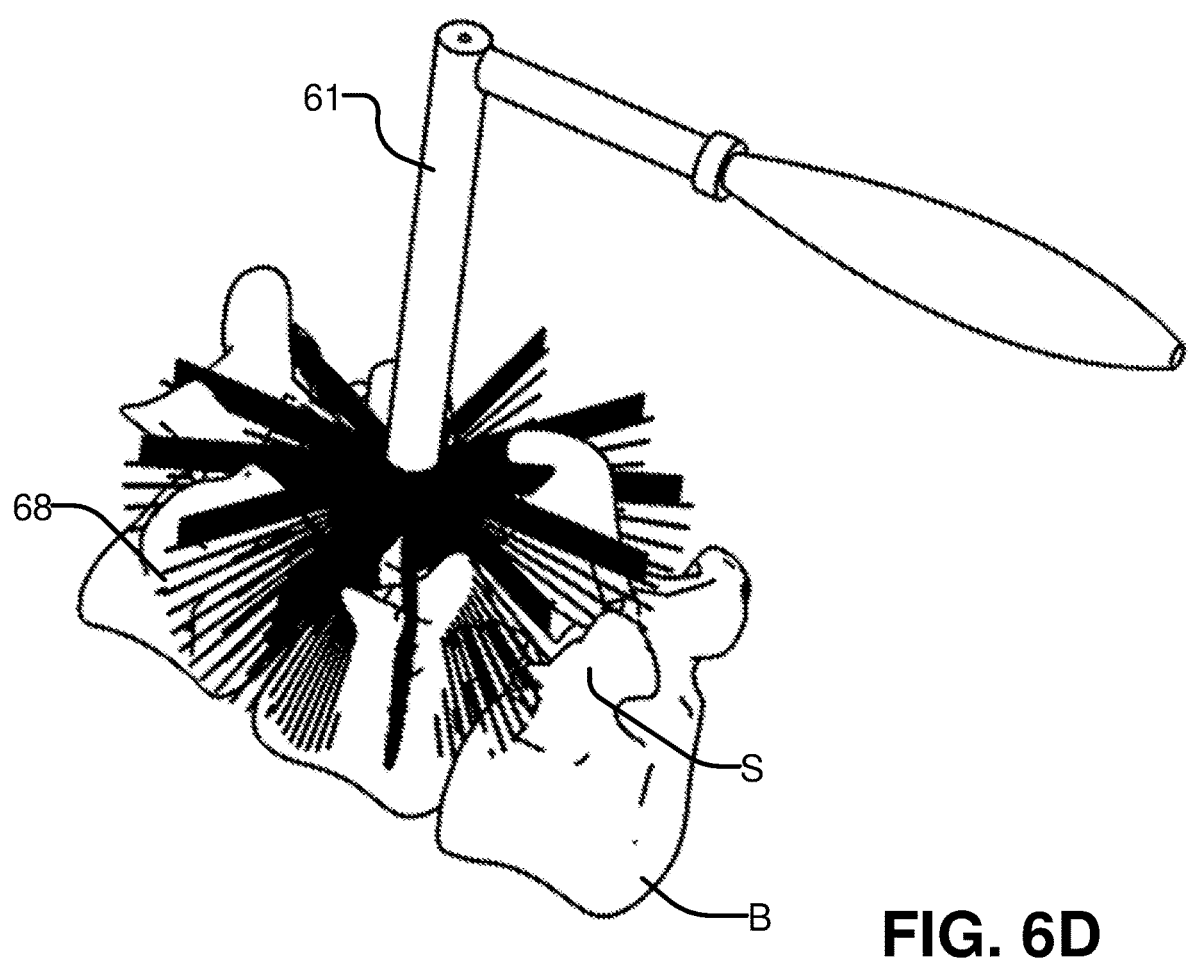

FIG. 6D shows an example drill guide 60 positioned in proximity to a body, B which in this example is a patient's spinal column. FIG. 6D includes measurement axes 68. Distances along measurement axes 68 to locations at which measurement axes 68 intersect surface S of body B may be made by processing output signals from range sensors, in this case ultrasound transducers 66 that operate as range sensors.

Figure 6E:
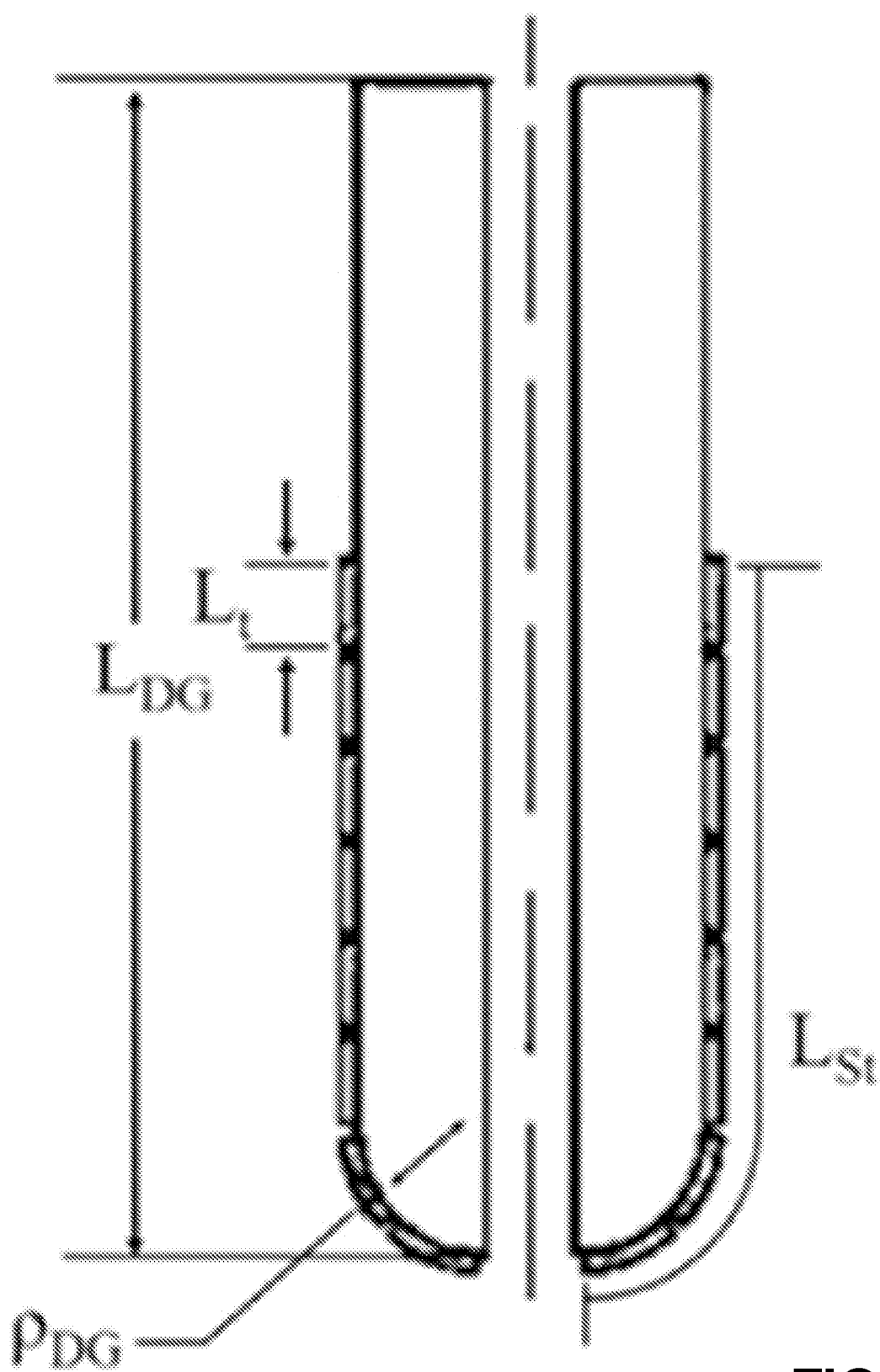
Figure 6F:
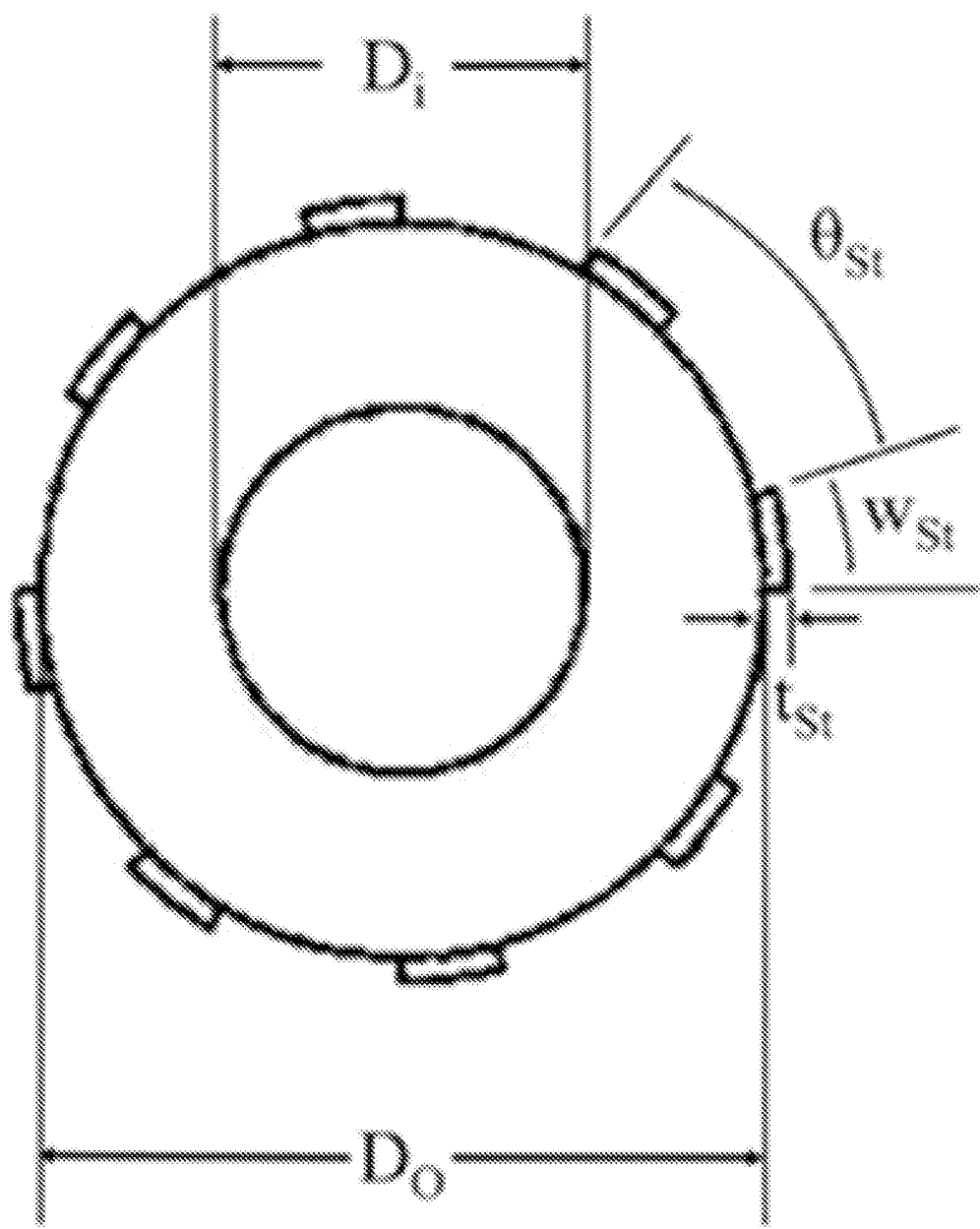

FIGS. 6E and 6F are respectively a longitudinal cross section view and a transverse cross section view of drill guide 60 showing dimensional parameters.

FIG. 6E shows the dimensions: overall length of drill guide 60, $L_{DG}$, length of each transducer element 66 $L_t$, length of each strip 65 of transducer elements $L_{st}$, and radius of curvature of front end 61A, $\rho_{DG}$.

FIG. 6F shows the dimensions: outer diameter of drill guide $D_O$, diameter of bore 61B of drill guide, $D_i$, angular separation of strips 65 of ultrasound transducers $\theta_{st}$, width of each strip 65 of ultrasound transducers $w_{st}$, and thickness of ultrasound transducers 66, $t_{st}$.

It is not mandatory to provide range sensors (e.g. strips of ultrasound transducers) on all sides of a drill guide or other apparatus, particularly where the drill guide or other apparatus is intended to be used with surface S on one side of the drill guide or other apparatus. In such cases a drill guide or other apparatus may have range sensors that are located entirely or more densely on a face or side of the drill guide or other apparatus that can be oriented to face surface S when the drill guide or other apparatus is used. For example, in some embodiments a drill guide or other apparatus has at least four strips 65 on a side or face of the drill guide or other apparatus that can be oriented to face toward a surface S. More strips 65 or other sensors may or may not be present on an opposing side of the drill guide or other apparatus.

In some embodiments, apparatus as described herein satisfies one or more, or a combination of two or more or all of the performance specifications summarized in the following table.

TABLE I

| Example Performance Specifications | |
|---|---|
| Accuracy | $\varepsilon < 1$ mm |
| Localization Limit | $\varepsilon > 10$ mm |
| Capture Range | $\varepsilon > 20$ mm |
| Cannula Diameter | $D < 30$ mm |
| Spinal Levels | L1 ↔ L5 |
| Time for initial registration | <30 s |

In an example embodiment, cannula 61 has a diameter of 20 mm, a length of 150 mm and a nose radius of 5 mm. Each strip 65 may, for example, have in the range of 30 to 100 ultrasound elements 65 spaced along a length of 25 mm to 50 mm (e.g. 32 mm). In some embodiments, ultrasound elements 66 each have areas on the order of 5 mm².

Design Optimization by Simulation

The inventors have evaluated the performance of drill guides of the general configurations illustrated in FIG. 7A to 7E that have different front end geometries, different dimensions and different arrangements of ultrasound transducer elements by performing computer simulations. The performance of a variety of algorithms for registration of the simulated drill guides were also tested by simulations. More than 300000 simulations have been performed for different combinations of these geometric and algorithmic parameters.

Each phase of the simulation involved running a set of MATLAB™-based simulations. In the simulations an STL model of a lumbar spine was loaded, along with a tool (an ultrasound augmented drill guide) with a geometry specified by a range of design parameters. The STL models were based on real-patient scans taken from open-source databases.

In addition to the geometric design parameters, the simulations used two parameters that approximately describe the expected range-finding performance of the transducers without introducing a detailed ultrasound physics model. These are (1) the precision of the distance measurement produced by each transducer element to the nearest bone surface ($\sigma$), and (2) the maximum distance at which the transducer measurement can be expected to reliably find bone surfaces ($d_{lim}$). In principle, $\sigma$ would be some nonlinear function of the distance to the bone. To simplify the simulations $\sigma$ was given a constant value. In the simulations, distances to bone surfaces that are further away than $d_{lim}$ were ignored (treated as missing).

A target axis was defined that was nominally aligned with the right-side pedicle channel of the L4 vertebra. The simulations were initialized with the tool positioned such that its axis was aligned with the target axis and the tool tip was located 10 mm from the pedicle surface.

With the simulated tool in this known position, distance measurements were simulated for each of the transducers by calculating the distance along a measurement axis for each transducer to the first bone surface encountered in the STL model. The distances were calculated using the MATLAB™ ray-face intersection algorithm to identify measurements against the meshed lumbar STL model. If no bone surface was encountered in a distance less than $d_{lim}$, a value of NaN was assigned to the distance measurement.

Gaussian noise was added to each simulated distance measurement. The width of the Gaussian noise distribution was specified by the parameter σ.

The simulations were performed for five geometries for the front end of the drill guide and corresponding parameterized layouts for ultrasound transducers. FIGS. 7A to 7E are semi-side views of drill guides which respectively have a number of longitudinally-extending, angularly spaced apart strips of ultrasound transducer elements, and front end geometries characterized by: flat front, all ultrasound transducers facing radially outward; flat front, all ultrasound transducers facing radially outward except for one forward-facing ultrasound transducer in each longitudinal strip; a front fan geometry, a polygonal front geometry; and a curved front geometry.

Figure 7A:
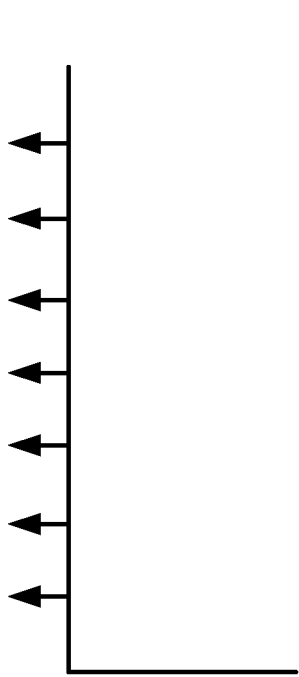
FIGS. 7A to 7E show example end geometries for drill guides.
Figure 7B:
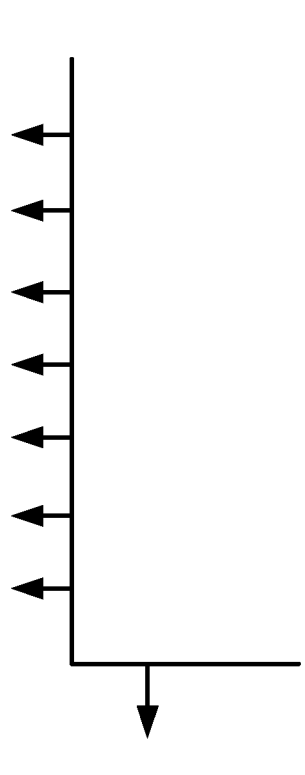
Figure 7C:
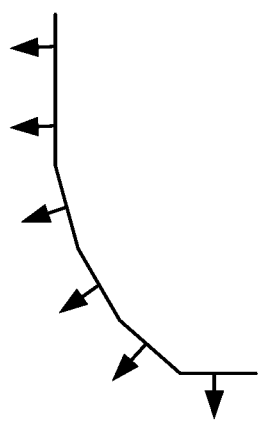
Figure 7D:
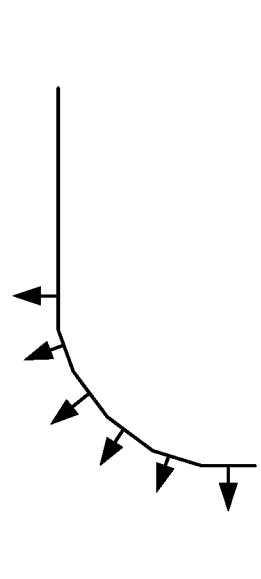
Figure 7E:
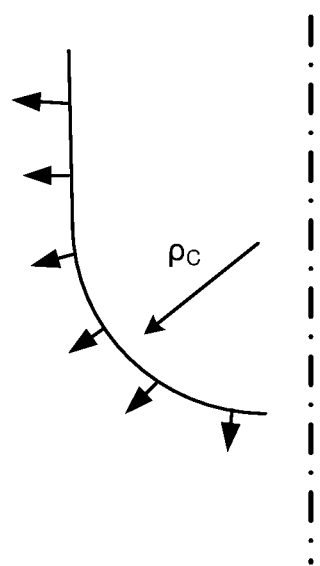

In the designs illustrated by FIGS. 7C to 7E all distance measurements are taken orthogonal to the surface of the drill guide. The transducer strip is allowed to bend to follow the shape of cannula 61. These designs may exploit the flexibility of Poly-CMUT ultrasound transducers. Since the largest acceptable diameter for the cannula is 30 mm and all of the designs that were considered include a 5 mm lumen 61B to receive a drill bit, the maximum radius of curvature for a circular tip is 25 cm. Two other sharper designs were also simulated. These designs had radii of curvature of 15 mm and 5 mm respectively.

Once a set of design parameters has been established, a final positional validation was performed for each simulated tool. This involved moving the true position of the tool in a hypersphere of radius 50 mm with 100 iterations at each position. The localization error and time to localization were then recorded to act as validation metrics.

The simulations simulated operation of the ultrasound transducers in range-finding mode by computing the distance from each ultrasound transducer element to the bone surface of the spine model and adding Gaussian error to emulate measurement error. Distances exceeding 50 mm were treated as being out of range. The simulations provided an initial pose guess to a state estimator which was configured to estimate the true position of the simulated drill guide.

An overall measure of combined errors in the final 6-DoF pose estimates, $\varepsilon_{LOC}$ yielded by the simulations was calculated by combining [positional errors with angular errors scaled by a typical pedicle length as follows:

$$\varepsilon_{LOC}=\sqrt{\Delta x_1^2+\Delta x_2^2+\Delta x_3^2+L_{PED}(\Delta\theta_1^2+\Delta\theta_2^2+\Delta\theta_3^2)} \quad (6)$$

where $L_{PED}$ is the typical pedicle length, which was taken to be 20.2 mm in the simulations.

The simulations evaluated the localization accuracy according to Eqn. 6 of different tool designs which differed by varying five geometric parameters (drill guide diameter, drill guide length, number of ultrasound strips, number of elements per strip, and drill guide shape).

A series of 100 simulations were run to evaluate the expected performance of each of several different state estimation algorithms for determining pose of the tool. For each of these simulations the tool tip was randomly displaced and rotated by a fixed effective error using an algorithm which determined the displacements and rotations such that the net translational displacements and the effective translational error by projecting the rotation across the pedicle resulted in the same effective error. Each potential position was checked for collision of the simulated drill guide with the bone surface. Positions for which collisions were detected were considered infeasible and not used. The state estimation algorithm was then run to estimate the pose of the tool.

The state estimation algorithms were run in parallel. In some experiments, simulations of state estimation algorithms were run on local compute nodes. In some experiments, multiple simulations were performed simultaneously using variable numbers of nodes on the Compute Canada Cedar network. After each set of 100 simulations, the mean equivalent error and the associated standard deviation were calculated.

Two algorithm parameters (state-estimation algorithm and number of parallel starts) were varied in these simulations. The tested algorithms included constrained and unconstrained optimization, an Unscented Kalman Filter (UKF), single and multi-start, and interior-point or global search optimization.

The simulations demonstrated numerous configurations with sub-millimetric accuracy near the pedicle with constrained or unconstrained interior-point optimization and UKF algorithms. Submillimetric convergence was achieved with greater than eight strips, outside cannula diameters in the range of 5 mm to 60 mm and a strip length in the range of 20 mm to 35 mm. The best tolerance to Gaussian error was achieved with 64 elements, 10 strips and a 32 mm strip length. In comparing configurations for arrays of ultrasound elements, the 5 mm-curved and quartic (polygon with β=4— see Eqn. 5) designs performed best.

A design with a 10 mm outside diameter drill guide with 10 strips of ultrasound transducers where each strip was 32 mm long and had 32 elements was selected for simulations to assess the performance of different state estimators. The simulations compared nine state estimators in terms of accuracy and runtime.

Figure 8:
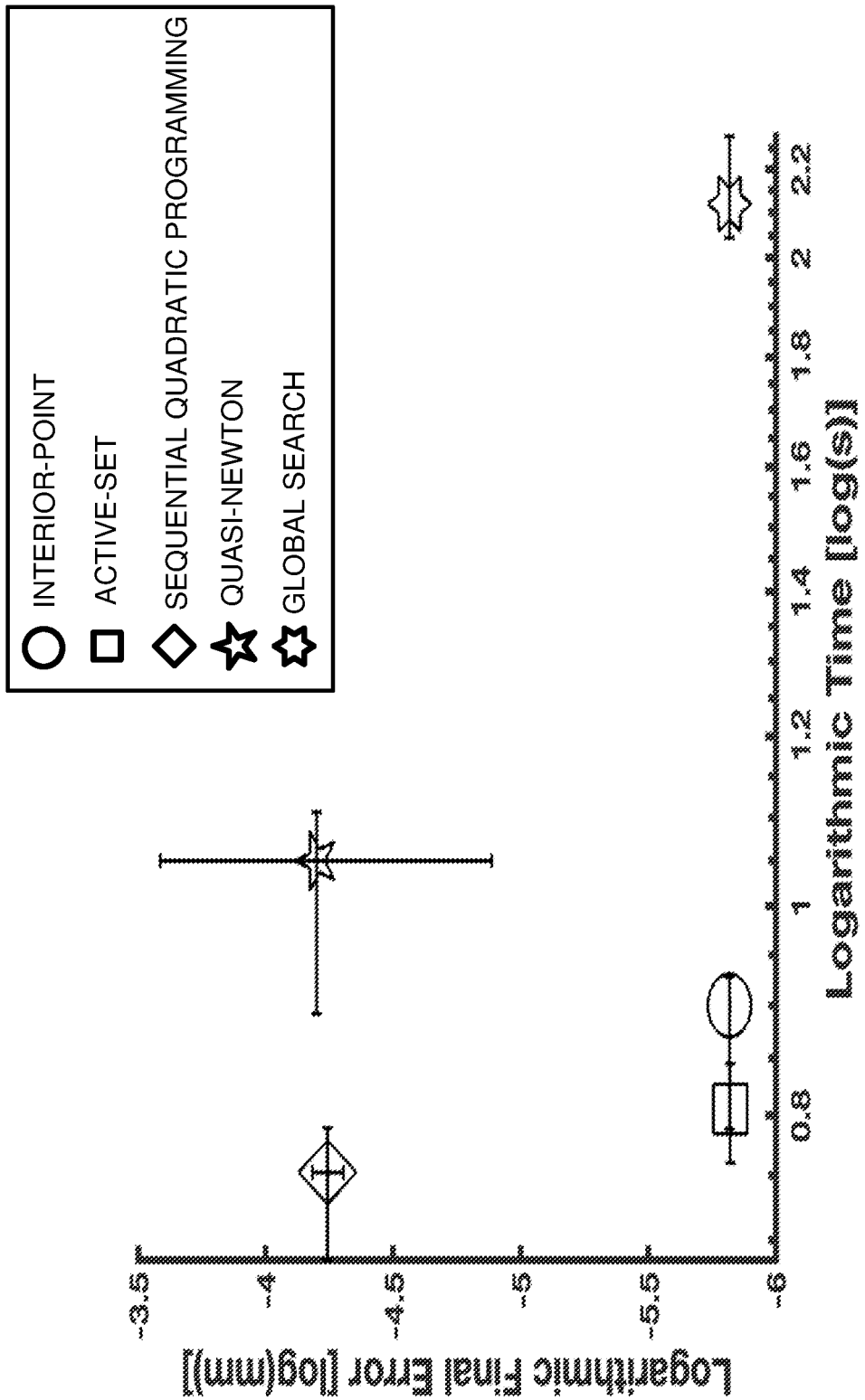
FIG. 8 is a scatter plot illustrating logarithm of final error vs. compute time for various state estimation algorithms.

Different state estimator algorithms were assessed based on their overall accuracy and the time it takes them to run. FIG. 8 is a scatterplot of Log error vs. log time for the algorithms of the following types: interior-point; active-set; sequential quadratic programming; quasi-Newton; and global search. The differences in final error varied significantly among algorithms.

State estimators that have been tested by simulation include:
- the Matlab™ function "fmincon" which is a constrained local solver based on the interior-point method;
- MultiSearchCon4, which is a four-start constrained local solver based on the MS-con function in Matlab™;
- MultiSearchCon8; which is an eight-start constrained local solver based on the MS-con function in Matlab™;
- the Matlab™ function "fminunc", which is an unconstrained local optimization algorithm based on the trust-region method;
- MultiSearchUnc4, which is a four-start unconstrained local solver based on the MS-unc function in Matlab™;
- MultiSearchUnc8 which is an eight-start unconstrained local solver based on the MS-unc function in Matlab™;
- global search, which is a GlobalSearch constrained algorithm based on the interior point algorithm in Matlab™;
- UKF and
- UKF+fmincon, which is an Unscented Kalman Filter initialized using the output of the constrained local solver fmincon.

In the simulations, a multi-start interior-point method with four parallelized searches provided the best balance of accuracy and speed. With a data processing system capable of executing more searches in parallel this balance could shift to multi-start methods that use more than four parallelized searches.

From FIG. 8 it can be observed that the results for any specific algorithm tend to cluster together with similar accuracy and time. This is more significant when considering that these results represent a range of different initial estimation error between 0 mm and 50 mm.

In simulations, local optimization subroutines (fmincon and fminunc) had the fastest run times. However, the most accurate localizations are from the global optimization routines which tend to have longer run times. MultiStartUnc was the least accurate of these, followed by GlobalSearch. MultiStartCon was the most accurate in the simulations.

For the MultiStart methods, run time increased roughly linearly with the number of start-points. Increasing the number of start points beyond four did not show a significant improvement in accuracy. The two methods involving the UKF were both the slowest and least accurate. The UKF may have utility as a tracking algorithm.

The performance of a drill guide having the design parameters summarized in the following Table I was validated and demonstrated submillimetric convergence in virtually all cases from 1000 initial positions distributed within 50 mm around the nominal target position.

TABLE 1

EXAMPLE DESIGN PARAMETERS FOR DRILL GUIDE

| PARAMETER | SYMBOL | VALUE |
|---|---|---|
| Outside diameter | $D_O$ | 10 mm |
| Drill guide length | $L_{DG}$ | 150 mm |
| Number of strips | $n_{st}$ | 10 |
| Strip length | $L_{st}$ | 32 mm |
| Number of ultrasound elements per strip | $n_t$ | 32 |
| Configuration | $\theta$ | See Eqn. (3) |
| State estimator | — | Multistart Constrained |
| Number of start points | | 4 |
| Cost function | | See Eqn. (1) |

The simulations found that configurations with both forward and lateral range-finding sensors performed well. Smooth transitions in the measurement angle of different range finding sensors (e.g. different ultrasound transducers used as range finders) seemed to improve the accuracy of estimated poses.

The simulations demonstrated that the measurement error tolerance increases with the number of transducers. A 95% hit rate out to 0.5 mm noise levels is achievable with at least 8 transducers per strip and with 8 strips.

The diameter of cannula 61 appears to have relatively little effect on localization performance as long as cannula 61 has a diameter large enough to accommodate a desired configuration of transducer elements (e.g. a desired number of strips 65 of transducer elements 66 having given dimensions) and as long as the diameter of cannula 61 is small enough to allow cannula 61 to be placed in a desired position relative to the STL model without colliding with surfaces of the STL model. For drill guides to be used for drilling holes for pedicle screws, the largest practical diameter is in the range of about 30 mm to 60 mm. Drill guides larger than 60 mm diameter are likely collide with nearby bone. Drill guides having diameters on the order of about 10 mm may be preferable for usability in applications like drilling holes for pedicle screws.

The orientation of the range sensors (e.g. ultrasound transducers) was also tested by simulation. The MultiStart-4 Constrained algorithm was used for this testing. Ten potential configurations were tested across a range of true positions. Their final localization error was recorded and plotted against the true position as the tool moved away from the pedicle. The differences in final error varied significantly between different configurations.

The simulation results demonstrate that the direct-out configuration (FIG. 7A) consistently performed worse than any other tested configuration. This is likely due to the lack of front facing transducers. The one forward and front fan configurations perform well at low initial errors, but then eventually start failing to converge. Similarly, spikes of non-convergence are seen across the rest of the rest of the designs with the exception of the quadratic configuration. Some embodiments use ultrasound transducers in configurations in which the ultrasound transducers near the tip of the cannula are oriented to provide a wide fanned out profile or are oriented by using a tip 61A that has a hemispherical shape.

Across all of the simulated configurations and trials, there is a strong positive relationship between the number of valid distance measurements and the accuracy of the localization. A larger number of valid distance measurements may be obtained by providing a larger number of transducer elements directed in a variety of directions from a variety of locations on support 12. The state-estimation algorithms nearly always converged when at least 20 or more transducers have recorded valid measurements. A larger number of valid distance measurements (e.g. 20 to 100 or more) tends to provide more accurate localization than a smaller number of distance measurements.

The simulations found that there are clear cut-off points for certain parameters above or below which localization would fail to converge. For configurations having strip length of less than about 20 mm localizations tended to fail to converge. Longer strips tended to produce very accurate results up to lengths of about 100 mm beyond which the accuracy began to drop. Strip lengths of about 30 mm were found to provide a good balance. The optimum strip length for a particular application will depend on the application (e.g. the form of surface S) as well as the number of transducers provided in each strip.

For configurations having fewer than seven strips of transducer elements the localizations tended to fail to converge. At least eight strips of transducer elements are required to achieve consistent localization and confident noise tolerance within the expected range. The best results were found in cases where each strip had at least 32 transducer elements.

Choosing configurations and algorithms that are tolerant to noise (measurement errors) can permit use of range sensors that are less accurate while still maintaining sufficient accuracy in establishing the pose of a support 12/tool 18. In general, designs having larger numbers of transducers tended to have better noise tolerance. More transducers mean that the Gaussian error of individual measurements can balance each other from a law of large numbers perspective. Designs having range sensors configured to measure distances to a surface S in more different directions tend to yield higher accuracy and better noise tolerance. For example, where the range sensors are provided by longitudinally extending strips of ultrasound transducers, providing a larger number of longitudinally extending circumferentially-spaced strips and arranging the transducer elements in each strip to be oriented to make a mixture of forward-facing and side-ranging distance measurements tended to provide better accuracy and noise tolerance, other factors being equal.

EXAMPLE VARIATIONS

Apparatus as described herein may be varied in many ways. For example, a support 12 or tool 18 may include an inertial measurement unit (IMU). Outputs of the IMU may be used alone or in combination with the output of a state estimator to track changes in the pose of support 12/tool 18 after registration as described herein.

Another possible variation is that apparatus 10 may include an optical tracker that tracks changes in the location of a support 12/tool 18. Outputs of the optical tracker may be used alone or in combination with the output of a state estimator to track changes in the pose of support 12/tool 18 after registration.

An IMU, optical tracker or electromagnetic tracker may additionally be used to track position or pose of a support 12/tool 18 at times when the support 12/tool 18 is too far away from a body B (e.g. a patient's spine) to perform registration/tracking as described elsewhere herein.

In some embodiments a registration and tracking system as described herein is incorporated to provide position and/or pose feedback to a robotic system that is configured to position a tool to perform an operation on a body B.

Figure 9A:
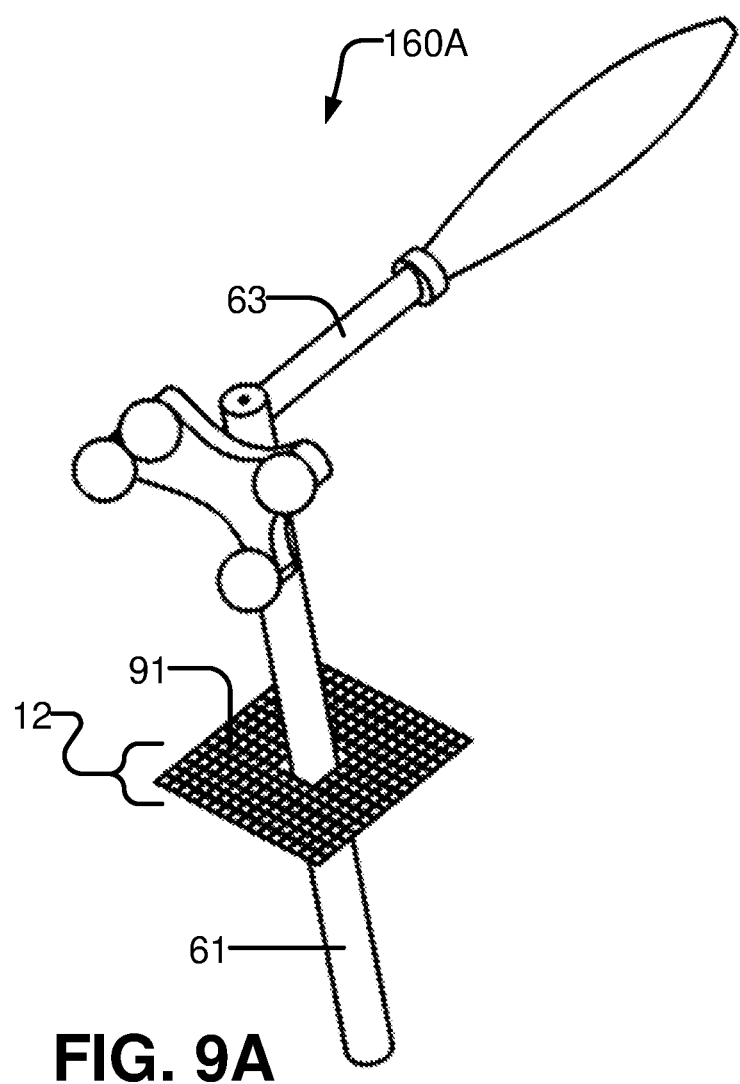
FIGS. 9A, 9B and 9C are perspective views illustrating alternative example drill guides

Range sensors may be supported relative to a tool in various ways. FIG. 9A shows an example tool 160A in which support 12 takes the form of a flange or plate projecting outwardly from cannula 61. Cannula 61 passes through support 12. Range sensors (e.g. ultrasound transducers) are located on support 12. The range sensors are operative to measure distances to locations on a surface S.

Figure 9B:
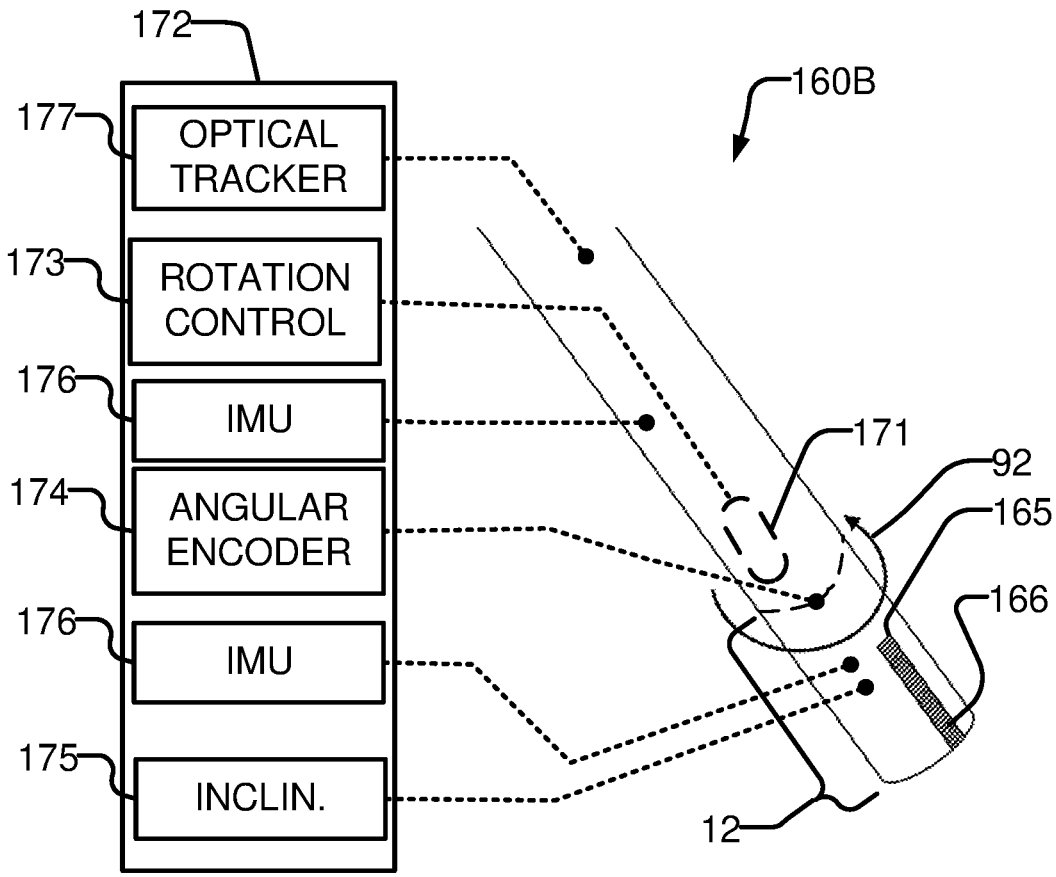

FIG. 9B is a partial view of a tool 160B that includes a number of range finding elements which in this example are provided by ultrasound elements 166 on a support 12. In this example ultrasound elements 166 are arranged in a strip 165. However, other arrangements are possible. Tool 160B may optionally have ultrasound elements 166 that are not arranged in a strip and/or two or more rows or strips of ultrasound elements.

Support 12 of tool 160B is driven to rotate as indicated by arrow 92. Rotation may be continuous in the same direction, intermittent or support 12 that carries strip 165 may oscillate through some angle. Elements 166 may be operated to obtain measurements of distances to surface S from in different directions as strip 165 is rotated. In some embodiments the rotation rate of strip 165 is, for example, 240 RPM or 240 oscillations per minute or less.

Tool 160B may include an actuator 171 such as an electric motor, servo motor, stepper motor, clockwork motor, or the like that causes the portion of the tool that carries strip 165 to rotate at a desired rate.

Tool 160B may include instrumentation 172 operative to monitor a current angle of rotation of support 12 and strip 165 relative to other parts of tool 12 and/or a reference axis such as a vertical direction and/or a direction of an axis about which transducer elements 166 are rotated. Instrumentation 172 may, for example, comprise a controller 173 of actuator 171, an angular encoder 174, an inclinometer 175, an inertial measurement unit (IMU) 176, and/or an optical or magnetic tracker 177 operable to track a location of tool 160B. Information from instrumentation 172, may be used, in some cases together with information regarding the locations of transducer elements 166 and/or characteristics of the rotation, to determine the directions corresponding to distance measurements made at given times using transducer elements 166 (and/or coordinates of points in a point cloud that correspond to distance measurements obtained using transducer elements 166.

In operation, multiple sets of distance measurements to a surface S are made. different sets of measurements are made when rotating transducer elements 166 are facing in different directions. The direction along which each distance measurement is made will depend on the times at which the measurement is made due to the rotation (which may be oscillation) of transducer elements 166. Knowing the directions of the distance measurements relative to tool 160B allows the pose of tool 160B to be determined using the approaches to registration and/or tracking described above.

Figure 9C:
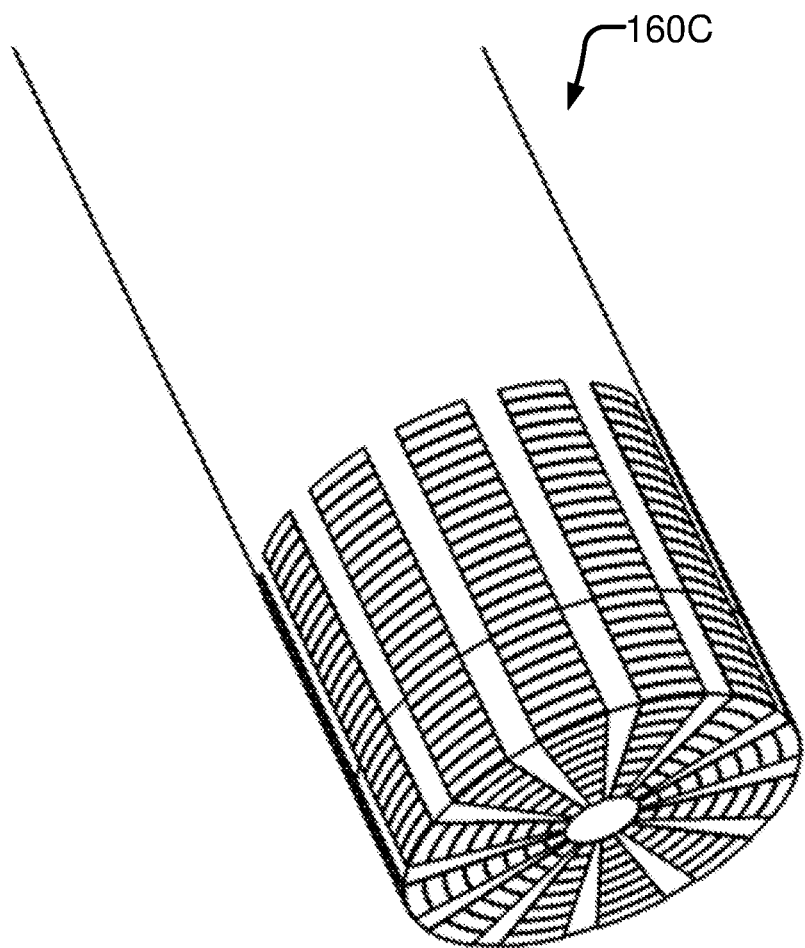

FIG. 9C is a partial view of a tool 160C that is configured with a flat front end. Forward-facing ultrasound transducer elements are located on the flat front end in radially extending strips. Side facing ultrasound transducer elements are located in longitudinally extending strips.

In some embodiments the apparatus described herein includes or is used together with a pose tracker that operates to track a pose of a support 12 or a tool 18 using some other modality. For example, apparatus as described herein may include one or more additional trackers (e.g. an optical tracker and/or an electromagnetic tracker operative to monitor a pose of a support 12 and/or tool 18). The additional tracker(s) may provide quick pose estimates. The apparatus and methods described elsewhere herein may provide more accurate pose estimates, possibly with a longer latency. In some embodiments, poses of support 12 or a tool 18 determined by an additional tracker are used as initial guesses for performing registration as described herein. In some embodiments, registration is performed as described elsewhere herein and tracking between successive registrations is performed using an additional tracker. In some embodiments information from an additional tracker is used to provide more accurate information regarding the directions along which measurements are being made in apparatus in which sensors are movable (e.g. tool 160B of FIG. 9B).

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Where a component (e.g. a software module, processor, transducer, range sensor, assembly, device, circuit, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

The present technology may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

INTERPRETATION OF TERMS

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms. These terms ("a", "an", and "the") mean one or more unless stated otherwise;
"and/or" is used to indicate one or both stated cases may occur, for example A and/or B includes both (A and B) and (A or B);
"approximately" when applied to a numerical value means the numerical value ±10%;
where a feature is described as being "optional" or "optionally" present or described as being present "in some embodiments" it is intended that the present disclosure encompasses embodiments where that feature is present and other embodiments where that feature is not necessarily present and other embodiments where that feature is excluded.
where any combination of features is described in this application the description of the combination of features is intended to serve as antecedent basis for the use of exclusive terminology such as "solely," "only" and the like in relation to the combination of features as well as the use of "negative" limitation(s) to exclude the presence of other features; and
"first" and "second" are used for descriptive purposes and cannot be understood as indicating or implying relative importance or indicating the number of indicated technical features.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a range for a value is stated, the stated range includes all sub-ranges of the range. It is intended that the statement of a range supports the value being at an endpoint of the range as well as at any intervening value to the tenth of the unit of the lower limit of the range, as well as any subrange or sets of sub ranges of the range unless the context clearly dictates otherwise or any portion(s) of the stated range is specifically excluded. Where the stated range includes one or both endpoints of the range, ranges excluding either or both of those included endpoints are also included in the invention.

Certain numerical values described herein are preceded by "about". In this context, "about" provides literal support for the exact numerical value that it precedes, the exact numerical value ±5%, as well as all other numerical values that are near to or approximately equal to that numerical value. Unless otherwise indicated a particular numerical value is included in "about" a specifically recited numerical value where the particular numerical value provides the substantial equivalent of the specifically recited numerical value in the context in which the specifically recited numerical value is presented. For example, a statement that something has the numerical value of "about 10" is to be interpreted as: the set of statements:
  in some embodiments the numerical value is 10;
  in some embodiments the numerical value is in the range of 9.5 to 10.5;
and if from the context the person of ordinary skill in the art would understand that values within a certain range are substantially equivalent to 10 because the values with the range would be understood to provide substantially the same result as the value 10 then "about 10" also includes:
  in some embodiments the numerical value is in the range of C to D where C and D are respectively lower and upper endpoints of the range that encompasses all of those values that provide a substantial equivalent to the value 10.

As will be apparent to those of skill in the art upon reading this disclosure, each of the individual embodiments described and illustrated herein has discrete components and features which may be readily separated from or combined with the features of any other described embodiment(s) without departing from the scope of the present invention.

Any aspects described above in reference to apparatus may also apply to methods and vice versa.

Any recited method can be carried out in the order of events recited or in any other order which is logically possible. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, simultaneously or at different times.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).This is the case even if features A and B are illustrated in different drawings and/or mentioned in different paragraphs, sections or sentences.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. Apparatus for monitoring a pose of a tool relative to an object, the apparatus comprising:
   a plurality of transducers arranged on a support, the support being integrated with or coupled to: the tool;
   the transducers operative to output one or more signals that encode plural measured distances, the plural measured distances respectively being between points having known locations relative to the support and points on a surface of the object;
   a data processing system configured to:
      process the one or more signals to obtain the plural measured distances; and
      process the plural measured distances to generate an estimated pose of the support relative to the object by finding the estimated pose of the support for which a measure of differences between:
      plural estimated distances, that are calculated using a computational model of the object and respectively correspond to the plural measured distances; and
      the plural measured distances; is minimized; and
   a user feedback interface operative to communicate to a user information about a current pose of the tool relative to the object.

2. The apparatus according to claim 1 wherein the data processing system comprises:
   a distance estimation component operative to receive an input pose of the support relative to the object and to generate the plural estimated distances corresponding to the input pose using the computational model of the object, wherein the plural estimated distances respectively correspond to the plural measured distances for the case where the pose of the support matches the input pose; and
   a pose estimation component configured to generate the estimated pose using the distance estimation component to find the estimated pose which minimizes the measure of differences between the plural measured distances and the plural estimated distances.

3. The apparatus according to claim 2 wherein the data processing system is configured to exclude from the plural measured distances, measured distances that exceed a threshold distance.

4. The apparatus according to claim 1 wherein processing the one or more signals to obtain the plural measured distances comprises processing the signals to form images of the object, comprising wherein the apparatus comprises a machine learning model having inputs for receiving the images of the object, the machine learning model being trained to segment the surface of the object from the images and to determine the plural measured distances based on the segmented surface of the object.

5. The apparatus according to claim 1 wherein the user feedback interface comprises a navigational display configured to graphically depict the current pose relative to the object.

6. The apparatus according to claim 5 wherein the navigational display is configured to graphically depict a desired pose for using the tool.

7. The apparatus according to claim 1 wherein the transducers comprise ultrasound transducers.

8. The apparatus according to claim 7 wherein the ultrasound transducers comprise capacitive micromachined ultrasonic transducers (CMUTs).

9. The apparatus according to claim 7 wherein the transducers are arranged in strips that extend along a surface of the support.

10. The apparatus according to claim 1 wherein the support is formed with a bore that extends through the support, the transducers are located on an outer surface of the support.

11. The apparatus according to claim 10 wherein the transducers include transducers that are disposed on a front portion of the outer surface of the support which is symmetrical about an axis of the bore.

12. The apparatus according to claim 11 wherein the front portion of the outer surface of the support comprises a cylindrical portion with a radiused front edge.

13. The apparatus according to claim 12 wherein the transducers are arranged in a plurality of circumferentially spaced apart strips that extend longitudinally parallel to the axis of the bore and curve around the radiused front edge such that some of the transducers face radially outward and some of the transducers face in an axial direction.

14. The apparatus according to claim 13 wherein the plurality of circumferentially spaced-apart strips comprises at least eight circumferentially spaced apart strips.

15. The apparatus according to claim 10 wherein the transducers are arranged such that the plural measured distances includes measured distances that are measured in directions that are radial relative to the bore and distances that are measured in directions that are axial relative to the bore and/or directions that are a combination of radial and axial relative to the bore.

16. The apparatus according to claim 1 wherein the tool comprises a drill that is received in a bore that extends through the support.

17. The apparatus according to claim 1 wherein the data processor comprises a state estimator having an input connected to receive the plural measured distances and an output comprising an updated estimated pose wherein the updated estimated pose is provided in real time.

18. The apparatus according to claim 1 wherein the tool comprises a guide configured to constrain another tool to be moved along an axis defined by the guide.

19. The apparatus according to claim 1 wherein the support is rotatable relative to the tool.

20. The apparatus according to claim 19 comprising an actuator for driving the support to rotate relative to the tool while the one or more signals are being generated.

21. The apparatus according to claim 2 wherein the computational model of the object is adaptive and models one or more joints between different parts of the object, and the data processing system is configured to estimate a current configuration of the one or more joints based on the plural measured distances.

22. The apparatus according to claim 1 wherein the object is a portion of a patient's spine and the tool is a surgical tool operable to remove bone from the patient's spine.

23. Apparatus for monitoring a pose of a tool relative to an object, the apparatus comprising:

a plurality of transducers arranged on a support, the support being integrated with or coupled to: the tool;

the transducers operative to output one or more signals that encode plural measured distances, the plural measured distances respectively being between points having known locations relative to the support and points on a surface of the object;

a data processing system configured to:

process the one or more signals to obtain the plural measured distances; and process the plural measured distances to generate an estimated pose of the support relative to the object, the data processing system comprising a machine learning model having inputs for receiving the plural measured distances, the machine learning model being trained to generate the estimated pose in response to the plural measured distances; and, a user feedback interface operative to communicate to a user information about a current pose of the tool relative to the object.

* * * * *